US010663616B2

(12) United States Patent
Morton

(10) Patent No.: US 10,663,616 B2
(45) Date of Patent: May 26, 2020

(54) X-RAY TOMOGRAPHY INSPECTION SYSTEMS AND METHODS

(71) Applicant: Rapiscan Systems, Inc., Torrance, CA (US)

(72) Inventor: Edward James Morton, Guildford (GB)

(73) Assignee: Rapiscan Systems, Inc., Torrance, CA (US)

(*) Notice: Subject to any disclaimer, the term of this patent is extended or adjusted under 35 U.S.C. 154(b) by 0 days.

(21) Appl. No.: 15/954,853

(22) Filed: Apr. 17, 2018

(65) Prior Publication Data
US 2018/0299580 A1 Oct. 18, 2018

Related U.S. Application Data

(60) Provisional application No. 62/486,130, filed on Apr. 17, 2017.

(51) Int. Cl.
G01V 5/00 (2006.01)
H01J 35/12 (2006.01)
H01J 35/06 (2006.01)
H01J 35/16 (2006.01)

(52) U.S. Cl.
CPC ............ G01V 5/0041 (2013.01); G01V 5/005 (2013.01); H01J 35/06 (2013.01); H01J 35/12 (2013.01); H01J 35/16 (2013.01); H01J 2235/068 (2013.01); H01J 2235/1245 (2013.01); H01J 2235/1262 (2013.01)

(58) Field of Classification Search
None
See application file for complete search history.

(56) References Cited

U.S. PATENT DOCUMENTS

| 4,472,822 A | 9/1984 | Swift |
| 7,349,525 B2 | 3/2008 | Morton |
| 7,440,543 B2 | 10/2008 | Morton |
| 7,505,563 B2 | 3/2009 | Morton |
| 7,512,215 B2 | 3/2009 | Morton |

(Continued)

FOREIGN PATENT DOCUMENTS

| WO | 1998002763 A1 | 1/1998 |
| WO | 2008024825 A2 | 2/2008 |

OTHER PUBLICATIONS

Keevil, S.V., Lawinski, C.P. and Morton, E.J., 1987, "Measurement of the performance characteristics of anti-scatter grids.", Phys. Med. Biol., 32(3), 397-403.

(Continued)

Primary Examiner — Hoon K Song
(74) Attorney, Agent, or Firm — Novel IP

(57) ABSTRACT

An X-ray inspection system for scanning items is provided. The system includes: a stationary X-ray source extending around a rectangular scanning volume, and defining multiple source points from which X-rays can be directed through the scanning volume; an X-ray detector array also extending around the rectangular scanning volume and arranged to detect X-rays from the source points which have passed through the scanning volume; a conveyor arranged to convey the items through the scanning volume; and at least one processor for processing the detected X-rays to produce scanning images of the items.

18 Claims, 22 Drawing Sheets

(56) References Cited

U.S. PATENT DOCUMENTS

| | | |
|---|---|---|
| 7,551,714 B2 | 6/2009 | Rothschild |
| 7,551,718 B2 | 6/2009 | Rothschild |
| 7,555,099 B2 | 6/2009 | Rothschild |
| 7,564,939 B2 | 7/2009 | Morton |
| 7,664,230 B2 | 2/2010 | Morton |
| 7,684,538 B2 | 3/2010 | Morton |
| 7,724,868 B2 | 5/2010 | Morton |
| 7,864,920 B2 | 1/2011 | Rothschild |
| 7,876,879 B2 | 1/2011 | Morton |
| 7,903,789 B2 | 3/2011 | Morton |
| 7,924,979 B2 | 4/2011 | Rothschild |
| 7,929,663 B2 | 4/2011 | Morton |
| 7,949,101 B2 | 5/2011 | Morton |
| 7,995,707 B2 | 8/2011 | Rothschild |
| 8,085,897 B2 | 12/2011 | Morton |
| 8,094,784 B2 | 1/2012 | Morton |
| 8,135,110 B2 | 3/2012 | Morton |
| 8,204,173 B2 | 6/2012 | Betcke |
| 8,223,919 B2 | 7/2012 | Morton |
| 8,243,876 B2 | 8/2012 | Morton |
| 8,331,535 B2 | 12/2012 | Morton |
| 8,451,974 B2 | 5/2013 | Morton |
| 8,552,722 B2 | 10/2013 | Lionheart |
| 8,559,592 B2 | 10/2013 | Betcke |
| 8,625,735 B2 | 1/2014 | Morton |
| 8,804,899 B2 | 8/2014 | Morton |
| 8,824,637 B2 | 9/2014 | Morton |
| 8,837,669 B2 | 9/2014 | Morton |
| 8,842,808 B2 | 9/2014 | Rothschild |
| 8,885,794 B2 | 11/2014 | Morton |
| 8,958,526 B2 | 2/2015 | Morton |
| 8,971,484 B2 * | 3/2015 | Beckmann ............ G01V 5/005 378/122 |
| 9,001,973 B2 | 4/2015 | Morton |
| 9,020,095 B2 | 4/2015 | Morton |
| 9,046,465 B2 | 6/2015 | Thompson |
| 9,048,061 B2 | 6/2015 | Morton |
| 9,086,497 B2 | 7/2015 | Bendahan |
| 9,093,245 B2 | 7/2015 | Morton |
| 9,113,839 B2 | 8/2015 | Morton |
| 9,158,030 B2 | 10/2015 | Morton |
| 9,183,647 B2 | 11/2015 | Morton |
| 9,208,988 B2 | 12/2015 | Morton |
| 9,263,225 B2 | 2/2016 | Morton |
| 9,420,677 B2 | 8/2016 | Morton |
| 9,442,082 B2 | 9/2016 | Morton |
| 9,442,213 B2 | 9/2016 | Bendahan |
| 9,562,866 B2 | 2/2017 | Morton |
| 9,576,766 B2 | 2/2017 | Morton |
| 9,606,259 B2 | 3/2017 | Morton |
| 9,618,648 B2 | 4/2017 | Morton |
| 9,638,646 B2 | 5/2017 | Morton |
| 9,675,306 B2 | 6/2017 | Morton |
| 9,714,920 B2 | 7/2017 | Lionheart |
| 9,726,619 B2 | 8/2017 | Thompson |
| 9,747,705 B2 | 8/2017 | Morton |
| 10,107,783 B2 | 10/2018 | Lionheart |
| 10,175,381 B2 | 1/2019 | Morton |
| 10,295,483 B2 | 5/2019 | Morton |
| 2001/0022830 A1 | 9/2001 | Sommer |
| 2009/0213989 A1 † | 8/2009 | Harding |
| 2009/0274277 A1 | 11/2009 | Morton |
| 2009/0316855 A1 | 12/2009 | Morton |
| 2010/0172476 A1 | 7/2010 | Morton |
| 2010/0284509 A1 * | 11/2010 | Oreper ............... G01V 5/0041 378/5 |
| 2012/0219116 A1 | 8/2012 | Thompson |
| 2013/0251098 A1 | 9/2013 | Morton |
| 2013/0264483 A1 | 10/2013 | Abenaim |
| 2014/0023181 A1 | 1/2014 | Noshi |
| 2014/0211916 A1 | 7/2014 | Morton |
| 2014/0294147 A1 * | 10/2014 | Chen ................. G01V 5/0016 378/57 |
| 2014/0342631 A1 | 11/2014 | Morton |
| 2015/0357148 A1 | 12/2015 | Morton |
| 2016/0343533 A1 | 11/2016 | Morton |
| 2017/0161922 A1 | 6/2017 | Morton |
| 2018/0038988 A1 | 2/2018 | Morton |
| 2018/0128754 A1 | 5/2018 | Thompson |
| 2019/0178821 A1 | 6/2019 | Morton |

OTHER PUBLICATIONS

Morton, E.J., Webb, S., Bateman, J.E., Clarke, L.J. and Shelton, C.G., 1990, "Three-dimensional x-ray micro-tomography for medical and biological applications.", Phys. Med. Biol., 35(7), 805-820.

Morton, E.J., Swindell, W., Lewis, D.G. and Evans, P.M., 1991, "A linear array scintillation-crystal photodiode detector for megavoltage imaging.", Med. Phys., 18(4), 681-691.

Morton, E.J., Lewis, D.G. and Swindell, W., 1988, "A method for the assessment of radiotherapy treatment precision", Brit. J. Radiol., Supplement 22, 25.

Swindell, W., Morton, E.J., Evans, P.M. and Lewis, D.G., 1991, "The design of megavoltage projection imaging systems: some theoretical aspects.", Med. Phys.,18(5), 855-866.

Morton, E.J., Evans, P.M., Ferraro, M., Young, E.F. and Swindell, W., 1991, "A video frame store facility for an external beam radiotherapy treatment simulator.", Brit. J. Radiol., 64, 747-750.

Antonuk, L.E., Yorkston, J., Kim, C.W., Huang, W., Morton, E.J., Longo, M.J. and Street, R.A., 1991, "Light response characteristics of amorphous silicon arrays for megavoltage and diagnostic imaging.", Mat. Res. Soc. Sym. Proc., 219, 531-536.

Yorkston, J., Antonuk, L.E., Morton, E.J., Boudry, J., Huang, W., Kim, C.W., Longo, M.J. and Street, R.A., 1991, "The dynamic response of hydrogenated amorphous silicon imaging pixels.", Mat. Res. Soc. Sym. Proc., 219, 173-178.

Evans, P.M., Gildersleve, J.Q., Morton, E.J., Swindell, W., Coles, R., Ferraro, M., Rawlings, C., Xiao, Z.R. and Dyer, J., 1992, "Image comparison techniques for use with megavoltage imaging systems.", Brit. J. Radiol., 65, 701-709.

Morton, E.J., Webb, S., Bateman, J.E., Clarke, L.J. and Shelton, C.G., 1989, "The development of 3D x-ray micro-tomography at sub 100Ã?Âμm resolution with medical, industrial and biological applications.", Presentation at IEE colloquium "Medical scanning and imaging techniques of value in non-destructive testing", London, Nov. 3, 1989.

Antonuk, L.E., Boudry, J., Huang, W., McShan, D.L., Morton, E.J., Yorkston, J, Longo, M.J. and Street, R.A., 1992, "Demonstration of megavoltage and diagnostic x-ray imaging with hydrogenated amorphous silicon arrays.", Med. Phys., 19(6), 1455-1466.

Gildersleve, J.Q., Swindell, W., Evans, P.M., Morton, E.J., Rawlings, C. and Dearnaley, D.P., 1991, "Verification of patient positioning during radiotherapy using an integrated megavoltage imaging system.", in "Tumour Response Monitoring and Treatment Planning", Proceedings of the International Symposium of the W. Vaillant Foundation on Advanced Radiation Therapy, Munich, Germany, Ed A. Breit (Berlin: Springer), 693-695.

Lewis, D.G., Evans, P.M., Morton, E.J., Swindell, W. and Xiao, X.R., 1992, "A megavoltage CT scanner for radiotherapy verification.", Phys. Med. Biol., 37, 1985-1999.

Antonuk, L.E., Boudry, J., Kim, C.W., Longo, M.J., Morton, E.J., Yorkston, J. and Street, R.A., 1991, "Signal, noise and readout considerations in the development of amorphous silicon photodiode arrays for radiotherapy and diagnostic x-ray imaging.", SPIE vol. 1443 Medical Imaging V: Image Physics, 108-119.

Antonuk, L.E., Yorkston, J., Huang, W., Boudry, J., Morton, E.J., Longo, M.J. and Street, R.A., 1992, "Radiation response characteristics of amorphous silicon arrays for megavoltage radiotherapy imaging.", IEEE Trans. Nucl. Sci., 39,1069-1073.

Antonuk, L.E., Yorkston, J., Huang, W., Boudry, J., Morton, E.J., Longo, M.J. and Street, R.A., 1992, "Factors affecting image quality for megavoltage and diagnostic x-ray a-Si:H imaging arrays.", Mat. Res. Soc. Sym. Proc., 258, 1069-1074.

Antonuk, L.E., Boudry, J., Yorkston, J., Morton, E.J., Huang, W. and Street, R.A., 1992, "Development of thin-film, flat-panel arrays for diagnostic and radiotherapy imaging.", SPIE vol. 1651, Medical Imaging VI: Instrumentation, 94-105.

(56) References Cited

OTHER PUBLICATIONS

Yorkston, J., Antonuk, L.E., Seraji, N., Boudry, J., Huang, W., Morton, E.J., and Street, R.A., 1992, "Comparison of computer simulations with measurements from a-Si:H imaging arrays.", Mat. Res. Soc. Sym. Proc., 258, 1163-1168.

Morton, E.J., Antonuk, L.E., Berry, J.E., Boudry, J., Huang, W., Mody, P., Yorkston, J. and Longo, M.J., 1992, "A CAMAC based data acquisition system for flat-panel image array readout", Presentation at IEEE Nuclear Science Symposium, Orlando, Oct. 25-31, 1992.

Antonuk, L.E., Yorkston, J., Huang, W., Boudry, J., Morton, E.J. and Street, R.A., 1993, "Large area, flat-panel a-Si:H arrays for x-ray imaging.", SPIE vol. 1896, Medical Imaging 1993: Physics of Medical Imaging, 18-29.

Morton, E.J., Antonuk, L.E., Berry, J.E., Huang, W., Mody, P. and Yorkston, J., 1994, "A data acquisition system for flat-panel imaging arrays", IEEE Trans. Nucl. Sci., 41(4), 1150-1154.

Antonuk, L.E., Boudry, J., Huang, W., Lam, K.L., Morton, E.J., TenHaken, R.K., Yorkston, J. and Clinthorne, N.H., 1994, "Thin-film, flat-panel, composite imagers for projection and tomographic imaging", IEEE Trans. Med. Im., 13(3), 482-490.

Gildersleve, J., Dearnaley, D., Evans, P., Morton, E.J. and Swindell, W., 1994, "Preliminary clinical performance of a scanning detector for rapid portal imaging", Clin. Oncol., 6, 245-250.

Hess, R., De Antonis, P., Morton, E.J. and Gilboy, W.B., 1994, "Analysis of the pulse shapes obtained from single crystal CdZnTe radiation detectors", Nucl. Inst. Meth., A353, 76-79.

DeAntonis, P., Morton, E.J., T. Menezes, 1996, "Measuring the bulk resistivity of CdZnTe single crystal detectors using a contactless alternating electric field method", Nucl. Inst. Meth., A380, 157-159.

DeAntonis, P., Morton, E.J., Podd, F., 1996, "Infra-red microscopy of CdZnTe radiation detectors revealing their internal electric field structure under bias", IEEE Trans. Nucl. Sci., 43(3), 1487-1490.

Tavora, L.M.N., Morgado, R.E., Estep, R.J., Rawool-Sullivan, M., Gilboy, W.B. and Morton, E.J., 1998, "One-sided imaging of large, dense, objects using the 511 keV photons from induced pair production", IEEE Trans. Nucl. Sci., 45(3), 970-975.

Morton, E.J., 1995, "Archaeological potential of computerised tomography", Presentation at IEE Colloquium on "NDT in archaeology and art", London, May 25, 1995.

Tavora, L.M.N. and Morton, E.J., 1998, "Photon production using a low energy electron expansion of the EGS4 code system ", Nucl. Inst. Meth., B143, 253-271.

Patel, D.C. and Morton, E.J., 1998, "Analysis of improved adiabatic pseudo-domino logic family", Electron. Lett., 34(19), 1829-1830.

Kundu, A and Morton, E.J., 1999, "Numerical simulation of argon-methane gas filled proportional counters", Nucl. Inst. Meth., A422, 286-290.

Lugger, R.D., Key, M.J., Morton, E.J. and Gilboy, W.B., 1999, "Energy dispersive X-ray scatter for measurement of oil/water ratios ", Nucl. Inst. Meth., A422, 938-941.

Morton, E.J., Crockett, G.M., Sellin, P.J. and DeAntonis, P., 1999, "The charged particle response of CdZnTe radiation detectors", Nucl. Inst. Meth., A422, 169-172.

Morton, E.J., Clark, R.J. and Crowley, C., 1999, "Factors affecting the spectral resolution of scintillation detectors", Nucl. Inst. Meth., A422, 155-158.

Morton, E.J., Gaunt, J.C., Schoop, K., Swinhoe, M., 1996, "A new handheld nuclear material analyser for safeguards purposes", Presentation at INMM annual meeting, Naples, Florida, Jul. 1996.

Hepworth, S., McJury, M., Oldham, M., Morton, E.J. and Doran, S.J., 1999, "Dose mapping of inhomogeneities positioned in radiosensitive polymer gels", Nucl. Inst. Meth., A422, 756-760.

Morton, E.J., Luggar, R.D., Key, M.J., Kundu, A., Tavora, L.M.N. and Gilboy, W.B., 1999, "Development of a high speed X-ray tomography system for multiphase flow imaging", IEEE Trans. Nucl. Sci., 46 III(1), 380-384.

Tavora, L.M.N., Morton, E.J., Santos, F.P. and Dias, T.H.V.T., 2000, "Simulation of X-ray tubes for imaging applications", IEEE Trans. Nucl. Sci., 47, 1493-1497.

TÃ?Â j vora, L.M.N., Morton, E.J. and Gilboy, W.B., 2000, "Design considerations for transmission X-ray tubes operated at diagnostic energies", J. Phys. D: Applied Physics, 33(19), 2497-2507.

Morton, E.J., Hossain, M.A., DeAntonis, P. and Ede, A.M.D., 2001, "Investigation of Au—CdZnTe contacts using photovoltaic measurements", Nucl. Inst. Meth., A458, 558-562.

Ede, A.M.D., Morton, E.J. and DeAntonis, P., 2001, "Thin-film CdTe for imaging detector applications", Nucl. Inst. Meth., A458, 7-11.

TÃ?Â j vora, L.M.N., Morton, E.J. and Gilboy, W.B., 2001, "Enhancing the ratio of fluorescence to bremsstrahlung radiation in X-ray tube spectra", App. Rad. and Isotopes, 54(1), 59-72.

Menezes, T. and Morton, E.J., 2001, "A preamplifier with digital output for semiconductor detectors", Nucl. Inst. Meth. A., A459, 303-318.

Johnson, D.R., Kyriou, J., Morton, E.J., Clifton, A.G. Fitzgerald, M. and MacSweeney, J.E., 2001, "Radiation protection in interventional radiology", Clin. Rad., 56(2), 99-106.

Tavora, L.M.N., Gilboy, W.B. and Morton, E.J., 2001, "Monte Carlo studies of a novel X-ray tube anode design", Rad. Phys. and Chem., 61, 527-529.

"Morton, E.J., 1998, "Is film dead: the flat plate revolution", Keynote Talk, IPEM Annual Conference, Brighton, Sep. 14-17, 1998"\.

Luggar, R.D., Morton, E.J., Jenneson, P.M. and Key, M.J., 2001, "X-ray tomographic imaging in industrial process control", Rad. Phys. Chem., 61, 785-787.

Luggar, R.D., Morton, E.J., Key, M.J., Jenneson, P.M. and Gilboy, W.B., 1999, "An electronically gated multi-emitter X-ray source for high speed tomography", Presentation at SPIE Annual Meeting, Denver, Jul. 19-23, 1999.

Gregory, P.J., Hutchinson, D.J., Read, D.B., Jenneson, P.M., Gilboy, W.B. and Morton, E.J., 2001, "Non-invasive imaging of roots with high resolution X-ray microtomography", Plant and Soil, 255(1), 351-359.

Kundu, A., Morton, E.J., Key, M.J. and Luggar, R.D., 1999, "Monte Carlo simulations of microgap gas-filled proportional counters", Presentation at SPIE Annual Meeting, Denver, Jul. 19-23, 1999.

Hossain, M.A., Morton, E.J., and Ozsan, M.E., 2002, "Photo-electronic investigation of CdZnTe spectral detectors", IEEE Trans. Nucl. Sci, 49(4), 1960-1964.

Panman, A., Morton, E.J., Kundu, A and Sellin, P.J., 1999, "Optical Monte Carlo transport in scintillators", Presentation at SPIE Annual Meeting, Denver, Jul. 19-23, 1999.

Jenneson, P.M., Gilboy, W.B., Morton, E.J., and Gregory, P.J., 2003, "An X-ray micro-tomography system optimised for low dose study of living organisms", App. Rad. Isotopes, 58, 177-181.

Key, M.J., Morton, E.J., Luggar, R.D. and Kundu, A., 2003, "Gas microstrip detectors for X-ray tomographic flow imaging", Nucl. Inst. Meth., A496, 504-508.

Jenneson, P.M., Luggar, R.D., Morton, E.J., Gundogdu, O., and Tuzun, U, 2004, "Examining nanoparticle assemblies using high spatial resolution X-ray microtomography", J. App. Phys, 96(5), 2889-2894.

Tavora, L.M., Gilboy, W.B. and Morton, E.J., 2000, "Influence of backscattered electrons on X-ray tube output", Presentation at SPIE Annual Meeting, San Diego, Jul. 30-Aug. 3, 2000.

Wadeson, N., Morton, E.J., and Lionheart, W.B., 2010, "Scatter in an uncollimated x-ray CT machine based on a Geant4 Monte Carlo simulation", SPIE Medical Imaging 2010: Physics of Medical Imaging, Feb. 15-18, 2010, San Diego, USA.

Morton, E.J., 2010, "Position sensitive detectors in security: Users perspective", Invited talk, STFC meeting on position sensitive detectors, RAL, May 2010.

International Search Report for PCT/US18/27872, dated Jul. 23, 2018.

* cited by examiner
† cited by third party

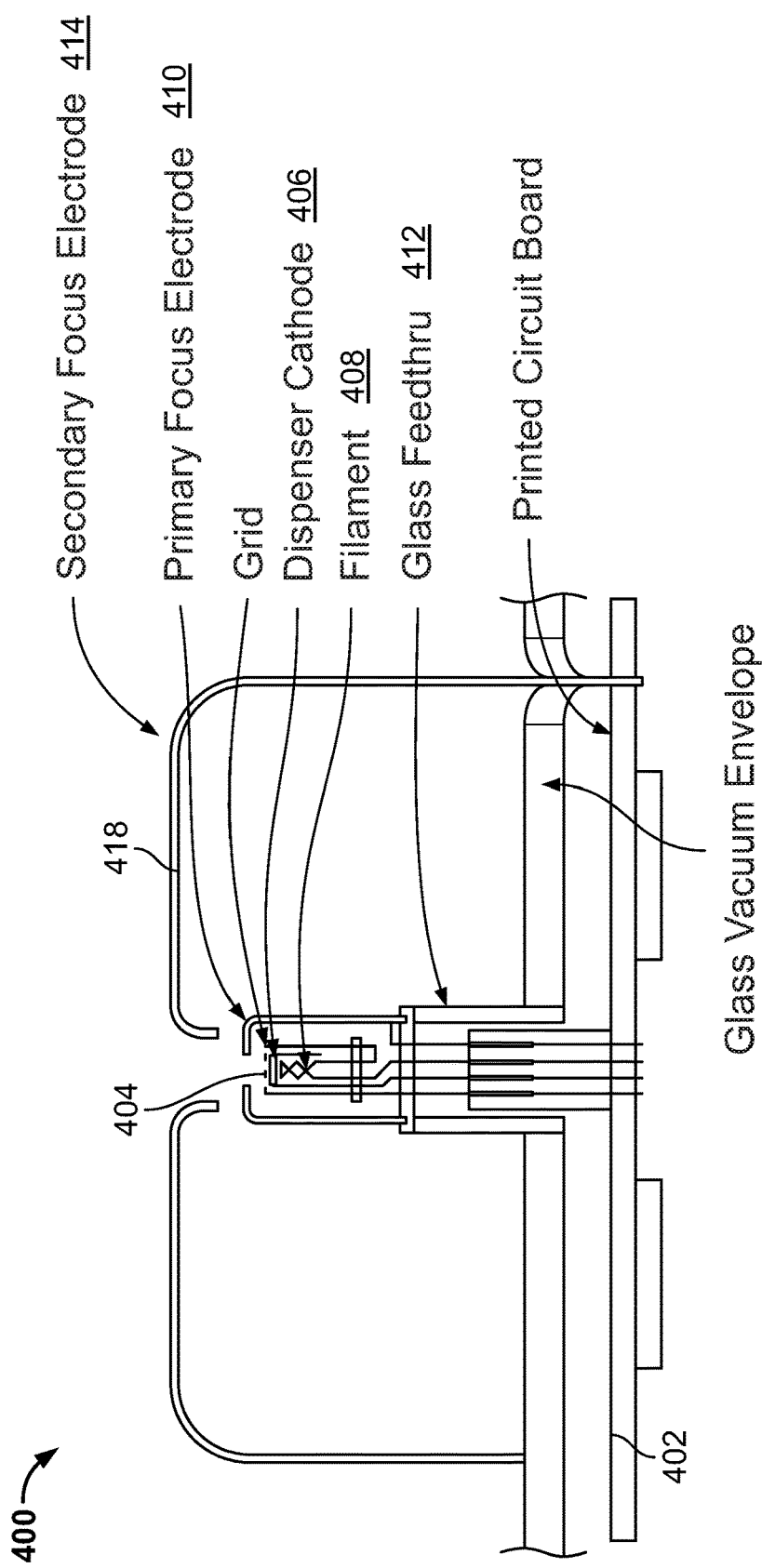

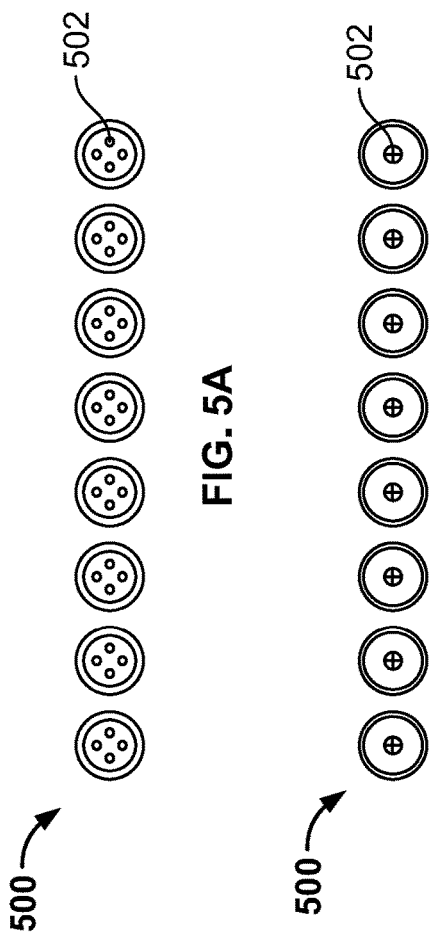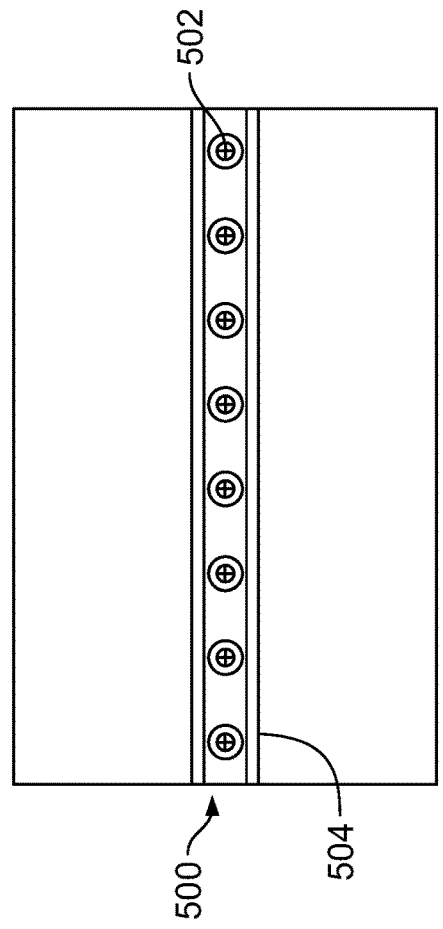

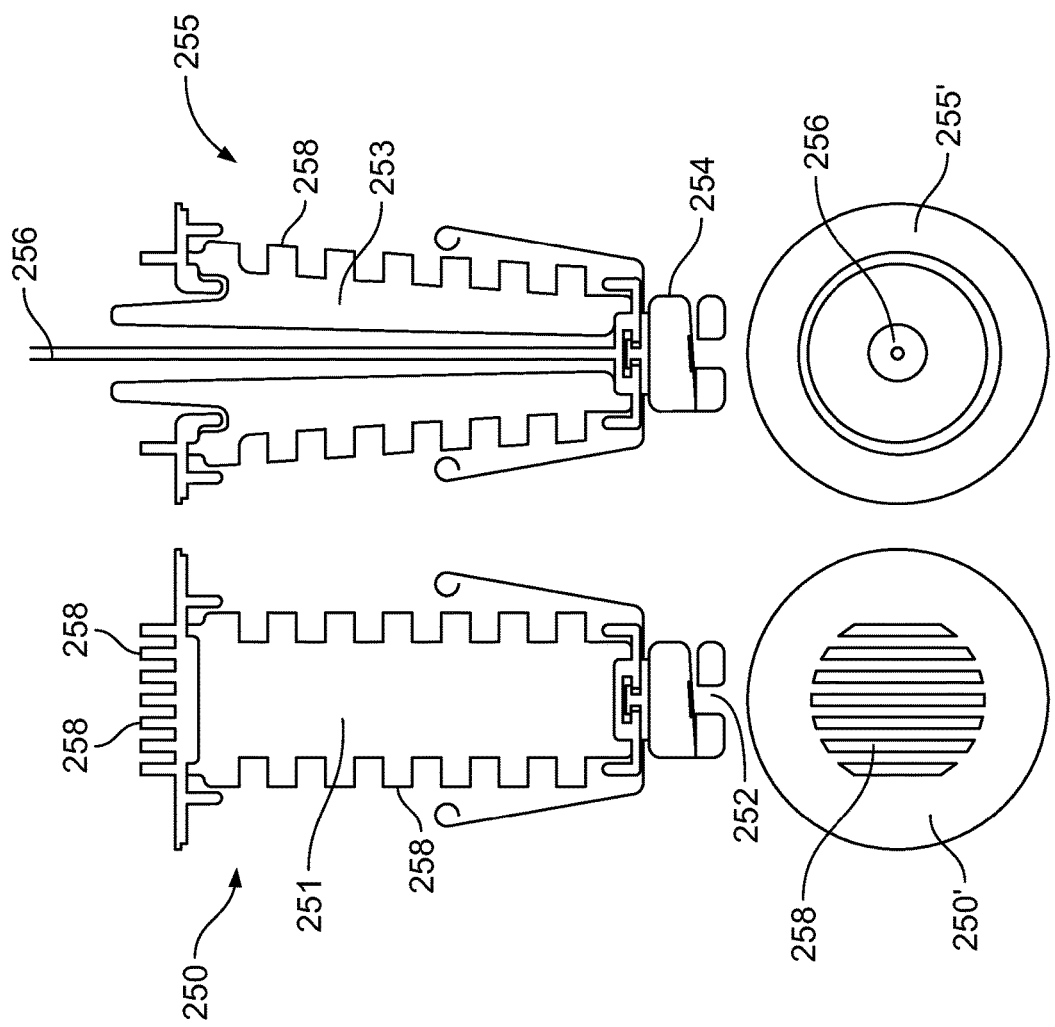

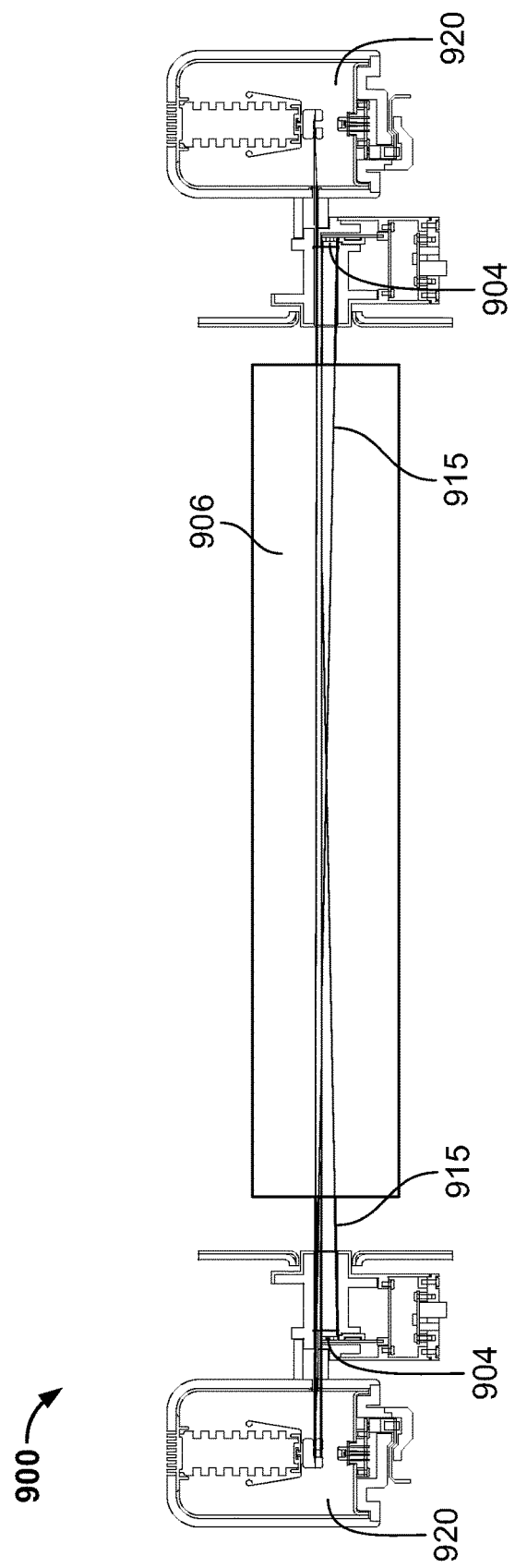

X-RAY TOMOGRAPHY INSPECTION SYSTEMS AND METHODS

CROSS-REFERENCE

The present specification relies on U.S. Patent Provisional Application No. 62/486,130, entitled "X-Ray Tomography Inspection Systems and Methods", filed on Apr. 17, 2017, for priority.

In addition, the present specification relates to U.S. Patent Provisional Application No. 62/597,155, entitled "X-Ray Tomography Inspection Systems and Methods", filed on Dec. 11, 2017 which is herein incorporated by reference in its entirety.

In addition, the present specification relates to U.S. patent application Ser. No. 15/132,439 ("the '439 application"), entitled "X-Ray Sources" and filed on Apr. 19, 2016. The '439 application is a continuation-in-part of U.S. patent application Ser. No. 14/635,814, entitled "X-Ray Sources" and filed on Mar. 2, 2015, which is a continuation of U.S. patent application Ser. No. 13/313,854, of the same title, and filed on Dec. 7, 2011, now issued U.S. Pat. No. 9,001,973, which, in turn, is a continuation of U.S. patent application Ser. No. 12/478,757 (the '757 application), filed on Jun. 4, 2009, now issued U.S. Pat. No. 8,094,784, which is a continuation-in-part of U.S. patent application Ser. No. 12/364,067, filed on Feb. 2, 2009, which is a continuation of U.S. patent application Ser. No. 12/033,035, filed on Feb. 19, 2008, which is a continuation of U.S. patent application Ser. No. 10/554,569, filed on Oct. 25, 2005, which is a national stage application of PCT/GB2004/001732, filed on Apr. 23, 2004 and which, in turn, relies on Great Britain Patent Application Number 0309374.7, filed on Apr. 25, 2003, for priority. The '757 application also relies on Great Britain Patent Application Number 0812864.7, filed on Jul. 15, 2008, for priority.

All of the aforementioned applications are herein incorporated by reference in their entirety.

FIELD

The present specification relates to X-ray scanning systems. More particularly, the present specification relates to a stationary gantry X-ray inspection system having a plurality of X-ray sources positioned around a volume of inspection such that the sources emit X-ray beams having different beam angles.

BACKGROUND

X-ray computed tomography (CT) scanners have been used in security screening in airports for several years. A conventional system comprises an X-ray tube that is rotated about an axis with an arcuate X-ray detector which is also rotated, at the same speed, around the same axis. The conveyor belt on which the baggage is carried is placed within a suitable aperture around the central axis of rotation, and moved along the axis as the tube is rotated. A fan beam of X-radiation passes from the source through the object to be inspected and subsequently to the X-ray detector array.

The X-ray detector array records the intensity of X-rays passed through the object to be inspected at several locations along its length. One set of projection data is recorded at each of a number of source angles. From these recorded X-ray intensities, it is possible to form a tomographic (cross-sectional) image, typically by means of a filtered back projection algorithm. In order to produce an accurate tomographic image of an object, such as a bag or package, there is a requirement that the X-ray source pass through every plane through the object. In the arrangement described above, this is achieved by the rotational scanning of the X-ray source, and the longitudinal motion of the conveyor on which the object is carried.

In this type of system the rate at which X-ray tomographic scans can be collected is dependent on the speed of rotation of the gantry that holds the X-ray source and detector array. In a modern CT gantry, the entire tube-detector assembly and gantry will complete two to four revolutions per second. This allows up to four or eight tomographic scans to be collected per second, respectively.

As the state-of-the-art has developed, the single ring of X-ray detectors has been replaced by multiple rings of detectors. This allows many slices (typically 8) to be scanned simultaneously and reconstructed using filtered back projection methods adapted from the single scan machines. With a continuous movement of the conveyor through the imaging system, the source describes a helical scanning motion about the object. This allows a more sophisticated cone-beam image reconstruction method to be applied that can in principle offer a more accurate volume image reconstruction.

However, rotating gantry X-ray inspection systems are expensive to install, have a large footprint and consume a lot of power.

Some conventional CT scanners comprise non-rotating stationary gantry systems, which project X-ray beams from fixed, stationary sources at the subjects to be scanned. These systems include one or more spatially distributed X-ray sources for emitting X-rays and one or more X-ray detectors for detecting the X-rays. Multiple X-ray sources are required to be activated at the same time to produce a fan beam of X-rays in order to create a three-dimensional scanned image of an object. Stationary gantry systems may use anywhere from a dozen to a few hundred X-ray sources to produce a scanned image that varies in quality depending on the number of X-ray sources used. However, increasing the number of sources adds complexity to the designs of scanning systems and also increases their cost of manufacturing as well as operation. Additionally, traditional stationary gantry systems consume high amounts of power and are difficult to maintain.

Hence, what is needed is an improved X-ray inspection system that is efficient in detecting threat materials, is less expensive, has a smaller footprint and may be operated using regular line voltage power.

SUMMARY

The following embodiments and aspects thereof are described and illustrated in conjunction with systems, tools and methods, which are meant to be exemplary and illustrative, not limiting in scope.

The present specification discloses an X-ray inspection system to scan an object, comprising: a housing enclosing a scanning volume; a conveyor to transport the object through the scanning volume for inspection; a multi-focus X-ray source having a plurality of X-ray source points arranged in a non-circular geometry around the scanning volume, wherein a beam angle of X-rays generated by each of the plurality of X-ray source points in not uniform across the plurality of X-ray source points; a detector array positioned between the X-ray source and the scanning volume, wherein said detector array has a plurality of multi-energy detector modules arranged in a non-circular geometry around the scanning volume to detect X-rays transmitted through the object during scanning; and a processor for analyzing sinogram data and reconstructed image data of the object being inspected to identify threat.

Optionally, the housing is substantially rectangular, wherein the housing has a width ranging from 800 mm to 1400 mm and a height ranging from 600 mm to 1500 mm.

Optionally, the non-circular geometry of the plurality of X-ray source points is rectangular.

Optionally, the non-circular geometry of the plurality of multi-energy detector modules is rectangular.

Optionally, the scanning volume has a width ranging from 500 mm to 1050 mm and a height ranging from 300 mm to 1050 mm.

Optionally, each of the plurality of multi-energy detector modules is configured to allocate detected photons into one of 2 to 64 energy bins.

Optionally, the multi-focus X-ray source has a plurality of X-ray source points ranging from 64 to 2048 X-ray source points, wherein the plurality of X-ray source points are configured in a plurality of groups, and wherein each of the plurality of groups has 4 to 32 X-ray source points. A group may comprise eight X-ray source points. Optionally, a common insulating substrate supports each of the group of the plurality of groups.

Optionally, the conveyor has a speed ranging from 0.1 m/s to 1.0 m/s.

The present specification also discloses a method of scanning an object using an X-ray scanner having a scanning volume, comprising: transporting the object through the scanning volume using a conveyor; irradiating the object with X-rays generated by a multi-focus X-ray source, wherein the X-ray source has a plurality of X-ray source points arranged in a first non-circular geometry around the scanning volume, and wherein X-ray beam angles of the plurality of X-ray source points is not uniform; detecting X-rays transmitted through the object using a detector array positioned between the X-ray source and the scanning volume, wherein said detector array has a plurality of multi-energy detector modules arranged in a second non-circular geometry around the scanning volume; and analyzing sinogram data and reconstructed image data of the object being inspected to identify threat.

Optionally, the first non-circular geometry of said plurality of X-ray source points is rectangular.

Optionally, the second non-circular geometry of said plurality of multi-energy detector modules is rectangular.

Optionally, the first non-circular geometry is the same as the second non-circular geometry.

Optionally, the scanning volume has a width ranging from 500 mm to 1050 mm and a height ranging from 300 mm to 1050 mm.

Optionally, each of the plurality of multi-energy detector modules allocates detected photons into one of 2 to 64 energy bins.

Optionally, said multi-focus X-ray source has a plurality of X-ray source points ranging from 64 to 2048 X-ray source points, wherein said plurality of X-ray source points are configured in a plurality of groups, and wherein each of said plurality of groups has 4 to 32 X-ray source points.

Optionally, said conveyor has a speed ranging from 0.1 m/s to 1.0 m/s.

Optionally, each of said X-ray source points has a dwell time ranging from 50 μs to 500 μs per scan projection.

The present specification also discloses an X-ray inspection system to scan an object, comprising: a housing enclosing a scanning volume; a conveyor to transport the object through the scanning volume for inspection; a multi-focus X-ray source having a plurality of X-ray source points arranged in a non-circular geometry around the scanning volume, wherein field of views of X-ray beams generated by each of said plurality of X-ray source points vary across said plurality of X-ray source points; a first detector array positioned between the X-ray source and the scanning volume, wherein said first detector array has a plurality of multi-energy detector modules arranged in a non-circular geometry around the scanning volume to detect X-rays transmitted through the object during scanning; a second detector array positioned between the X-ray source and the scanning volume to detect X-rays diffracted from the object during scanning, wherein said second detector array has a plurality of energy dispersive detector modules located behind a plurality of associated collimators that are angled to the X-ray beams; and a processor for simultaneously generating a tomographic transmission image using said X-rays transmitted through the object and a tomographic diffraction image using said X-rays diffracted from the object in order to identify threat.

Optionally, said field of views range from approximately 60 degrees to 120 degrees.

Optionally, said collimators are angled at an angle ranging from 3 degrees to 10 degrees to the direction of the X-ray beams.

Optionally, a portion of at least one of said first and second detector arrays detect X-rays backscattered from the object, wherein said processor also generates a backscatter image of the object that is also used to identify threat objects. The tomographic diffraction image and/or said backscatter image may be used to clear or confirm a threat raised by analysis of said tomographic transmission image.

The present specification also discloses an X-ray inspection system for scanning items, the system comprising: a stationary X-ray source extending around a rectangular scanning volume, and defining a plurality of source points from which X-rays can be directed through the scanning volume; an X-ray detector array also extending around the rectangular scanning volume and arranged to detect X-rays from the source points which have passed through the scanning volume; a conveyor arranged to convey the items through the scanning volume; and at least one processor for processing the detected X-rays to produce scanning images of the items.

Optionally, each source point emits X-rays having a different beam angle.

Optionally, each source point is enclosed in one of a glass, metal, and ceramic envelope.

Optionally, each source point comprises: an anode assembly comprising a target coupled with a high voltage power source; one or more slip coupling blocks for accounting of thermal expansion of the target; and a shield electrode for protecting the target and power source from X-rays; and a cathode assembly comprising at least a grid, a dispenser cathode, a filament and a primary focus electrode plugged into a printed circuit board, and a secondary focus electrode for protecting the cathode assembly from any flash of energy.

Optionally, the target is formed from a copper coolant tube providing coolant to the anode assembly.

Optionally, the coolant tube is molded into the target by using hydroforming.

Optionally, the secondary electrode is maintained at ground potential.

Optionally, the target is coated with silicon carbide and then patterned with tungsten rich tungsten carbide stripes.

Optionally, the target comprises a plurality of raised portions to define fan-shaped apertures.

The aforementioned and other embodiments of the present specification shall be described in greater depth in the drawings and detailed description provided below.

BRIEF DESCRIPTION OF THE DRAWINGS

These and other features and advantages of the present invention will be further appreciated, as they become better understood by reference to the detailed description when considered in connection with the accompanying drawings:

FIG. 4A illustrates a cathode assembly, in accordance with an embodiment of the present specification;

FIG. 5A is a top plan view of a cathode array, in accordance with an embodiment of the present specification;

FIG. 5B is a bottom plan view of the cathode array shown in FIG. 5A, in accordance with an embodiment of the present specification;

FIG. 5C is another view of the cathode array shown in FIG. 5B;

FIG. 8D illustrates a plurality of heat conductive and voltage supply structures, in accordance with embodiments of the present specification;

FIG. 9 is a cross-sectional view, through an imaging volume, of a scanning unit in accordance with embodiments of the present specification;

DETAILED DESCRIPTION

In embodiments, the present specification provides an inspection system having a substantially rectangular or non-circular locus of source points used to scan the scanning volume. In an embodiment, the inspection system is a real-time tomography (RTT) system. In an embodiment, the source points are arranged in a non-circular or substantially rectangular geometry around the scanning volume. Due to the non-circular geometry of the X-ray source points, the inspection system is cost effective, has a smaller footprint and may be operated using regular line voltage to supply power to the high voltage power supply, which is then used to provide power to the X-ray source.

In various embodiments, the X-ray sources emit fan beams which have different beam angles based on the location of the X-ray source points with respect to the imaging volume.

In an embodiment, both the anode and cathode of an X-ray tube generating X-rays is machine fabricated and installed onto a glass base. The base is then sealed with a glass top by using glass melting techniques, thereby resulting in an anode and a cathode enveloped in a glass vacuum envelope. Since glass provides a lower X-ray absorption (as it is a low Z material) as a transmission material, the inspection system of the present specification provides improved material discrimination. In an embodiment, the cathode comprises a secondary electrode held at ground potential that absorbs flashes of energy or short circuits within the cathode.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In the description and claims of the application, each of the words "comprise" "include" and "have", and forms thereof, are not necessarily limited to members in a list with which the words may be associated. It should be noted herein that any feature or component described in association with a specific embodiment may be used and implemented with any other embodiment unless clearly indicated otherwise.

Figure 1:
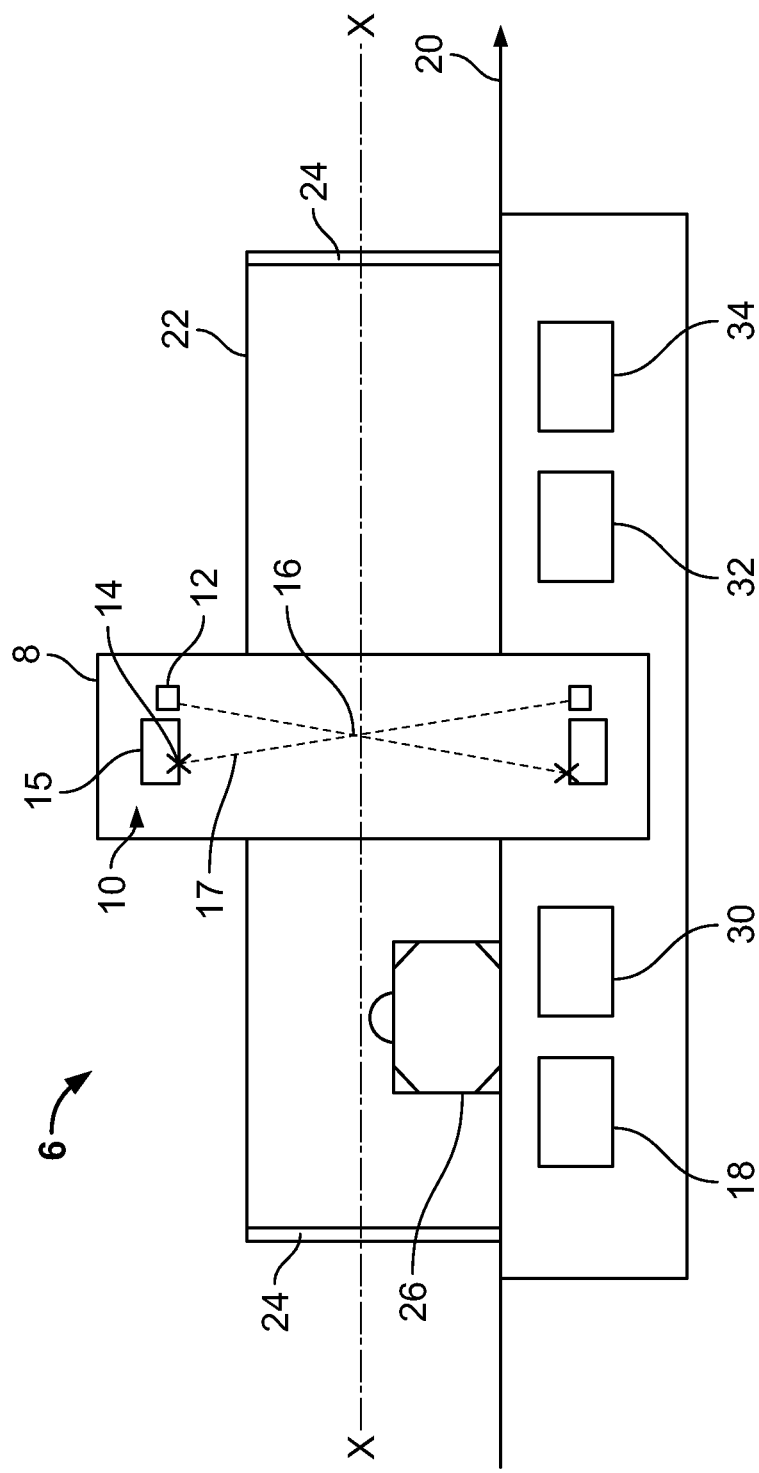
FIG. 1 is a longitudinal schematic view of a real time tomography security scanning system having a circular locus of source points, produced by conventional systems.

FIG. 1 illustrates a conventional inspection system having a circular locus of source points. Referring to FIG. 1, a concourse baggage scanning system 6 comprises a scanning unit 8 which includes a multi-focus X-ray source 10 and X-ray detector array 12. The source 10 comprises a large number of source points 14 positioned in respective, spaced locations on the source, and arranged in a full 360 degree circular array about the X-X axis of the system (which is parallel to the conveyor belt 20). It will be appreciated that curved arrays covering less than the full 360 degree angle can also be used. The source 10 can be controlled to produce X-rays from each of the source points 14 in each of the source units individually whereby X-rays from each source point 14 are directed inwards through the scanning region 16 within the circular source 10. The source 10 is controlled by a control unit 18 which controls the applied electrical potentials (to the grid wires) and hence controls the emission of X-rays from each of the source points 14.

The multi-focus X-ray source 10 allows the electronic control circuit 18 to be used to select which of the many individual X-ray source points 14 within the multi-focus X-ray source is active at any moment in time. Hence, by electronically scanning the multi-focus X-ray tube, X-ray source virtual "motion" is created with no actual physical movement of mechanical parts. In this case, the angular velocity of source rotation can be increased to levels that simply cannot be achieved when using conventional rotating X-ray tube assemblies. This rapid rotational scanning translates into an equivalently speeded up data acquisition process and, as a result, fast image reconstruction.

The detector array 12 is also circular and arranged around the axis X-X in a position that is slightly offset in the axial direction from the source 10. The source 10 is arranged to direct the X-rays it produces through the scanning region 16 towards the detector array 12 on the opposite side of the scanning region. The paths 17 of the X-ray beams therefore pass through the scanning region 16 in a direction that is substantially, or almost, perpendicular to the scanner axis X-X, crossing each other near to the axis. The volume of the scanning region that is scanned and imaged is therefore in the form of a thin slice perpendicular to the scanner axis X-X. The source is scanned so that each source point emits X-rays for a respective period, the emitting periods being arranged in a predetermined order. As each source point 14 emits X-rays, the signals from the detectors 12, which are dependent on the intensity of the X-rays incident on the detector, are produced, and the intensity data that the signals provide are recorded in a memory. When the source has completed its scan the detector signals can be processed to form an image of the scanned volume.

A conveyor belt 20 moves through the imaging volume, from left to right, as seen in FIG. 1, parallel to the axis X-X of the scanner. X-ray scatter shields 22 are located around the conveyor belt 20 upstream and downstream of the main X-ray system to prevent operator dose due to scattered X-rays. The X-ray scatter shields 22 include lead rubber strip curtains 24 at the open ends of the system such that the item 26 under inspection is conveyed through one curtain on entering the inspection region and another curtain upon leaving the inspection region. In the integrated system shown, the main electronic control system 18, a processing system 30, a power supply 32 and cooling racks 34 are shown mounted underneath the conveyor 20. The conveyor 20 is arranged to be operated normally with a continuous scanning movement at constant conveyor speed, and typically has a carbon-fiber frame assembly within the imaging volume.

It should be noted that the systems described throughout this specification comprise at least one processor (such as processing system 30) to control the operation of the system and its components. It should further be appreciated that the at least one processor is capable of processing programmatic instructions, has a memory capable of storing programmatic instructions, and employs software comprised of a plurality of programmatic instructions for performing the processes described herein. In one embodiment, the at least one processor is a computing device capable of receiving, executing, and transmitting a plurality of programmatic instructions stored on a volatile or non-volatile computer readable medium.

The present invention is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In the description and claims of the application, each of the words "comprise" "include" and "have", and forms thereof, are not necessarily limited to members in a list with which the words may be associated. It should be noted herein that any feature or component described in association with a specific embodiment may be used and implemented with any other embodiment unless clearly indicated otherwise.

For the purposes of this specification, a filtered back-projection method is defined to describe any transmission or diffraction tomographic technique for the partial or complete reconstruction of an object where a filtered projection is back-projected into the object space; i.e., is propagated back into object space according to an inverse or approximate inverse of the manner in which the beam was originally transmitted or diffracted. The filtered back-projection method is usually implemented in the form of a convolution of filters and directly calculates the image in a single reconstruction step.

For the purposes of this specification an iterative reconstruction method refers to iterative algorithms (versus a single reconstruction algorithm) used to reconstruct 2D and 3D images such a computed tomography where an image must be reconstructed from projections of an object.

In various embodiments of the present specification a non-circular locus of source points is used to scan a scanning volume as described above. This provides an inspection system having a smaller footprint with the same inspection volume as the scanning system shown in FIG. 1. Further, due to the smaller footprint, the power usage requirement is lower and the scanner described in the present specification can be operated with regular line voltage, which is used to supply power to the high voltage power supply, which is in turn used to provide power to the X-ray source, instead of the three-phase power required for conventional scanning systems such as that shown in FIG. 1.

Figure 2A:
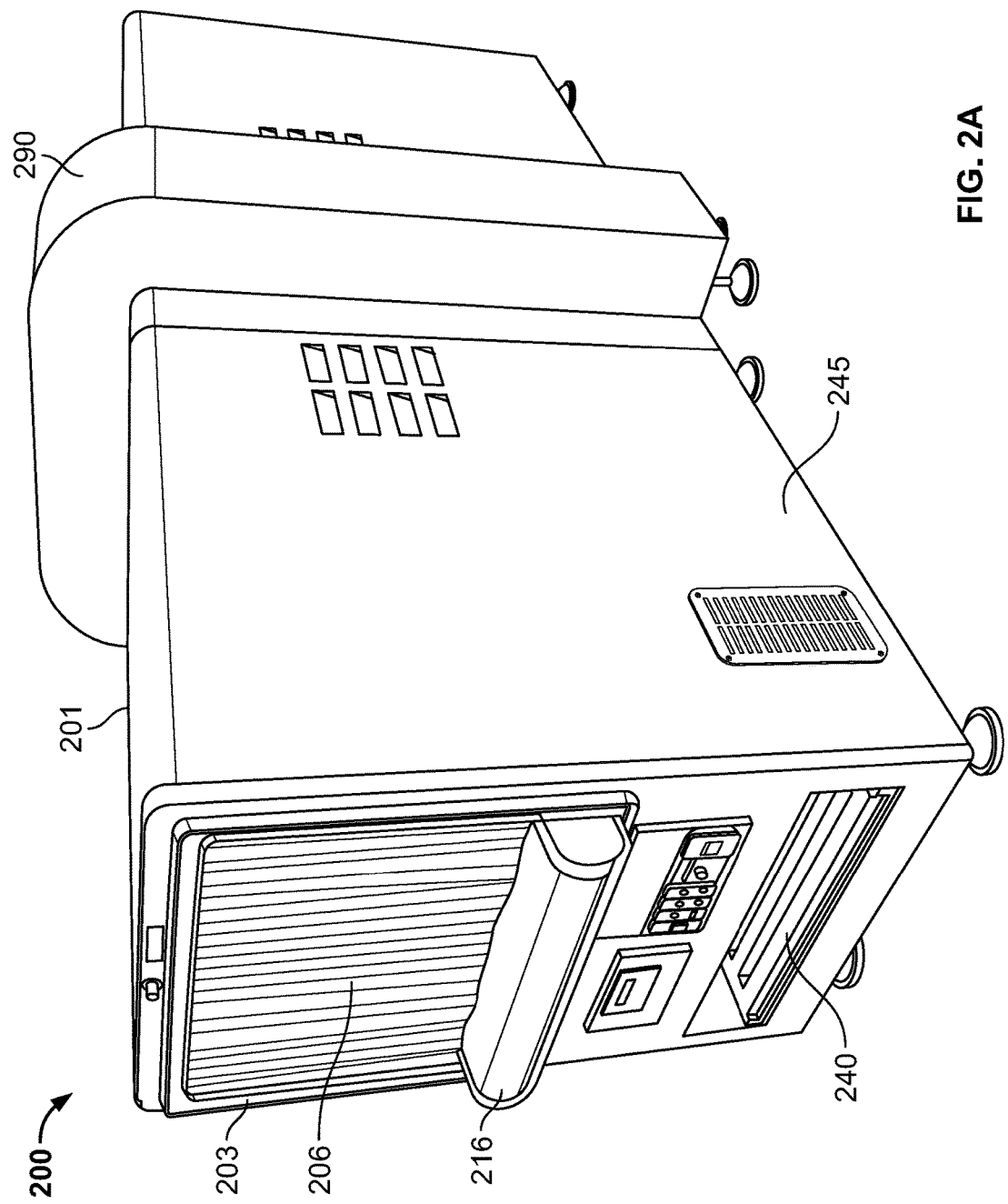
FIG. 2A is a perspective view of a scanning unit, in accordance with an embodiment of the present specification.

In accordance with an embodiment of the present specification, FIG. 2A is a perspective view of a scanning unit 200, shown from a first side 245, comprising a substantially rectangular housing/enclosure 201 for housing a plurality of X-ray source points and detectors. It should be appreciated that, in alternate embodiments, the housing 201 may have a quadrilateral shape, such as, but not limited to, a square. An object under inspection is conveyed through a first open end or scanning aperture 203, enters an inspection region 206, and exits through a second open end (opposite to the first open end 203). In accordance with an embodiment, both feed and return conveyor loops pass through a space 216 just below the inspection region 206, while space or compartment 240 is reserved in the base of the scanning system (approximately 200 mm deep) to accommodate automated return of trays when integrated with an automatic tray return handling system. The scanning unit 200 has an external body comprising the components stated above within said body. In embodiments, the body of unit 200 is shaped similar to a large elongated right rectangular prism, or a rectangular cuboid with curved corners. In some embodiments, the unit 200 is an extension of the shape of housing/enclosure 201. In embodiments, the inspection region 206 positioned within housing 201 is shaped similar to housing 201. In some embodiments, a narrow projection 290 encompasses three external surfaces of the unit 200.

Figure 2B:
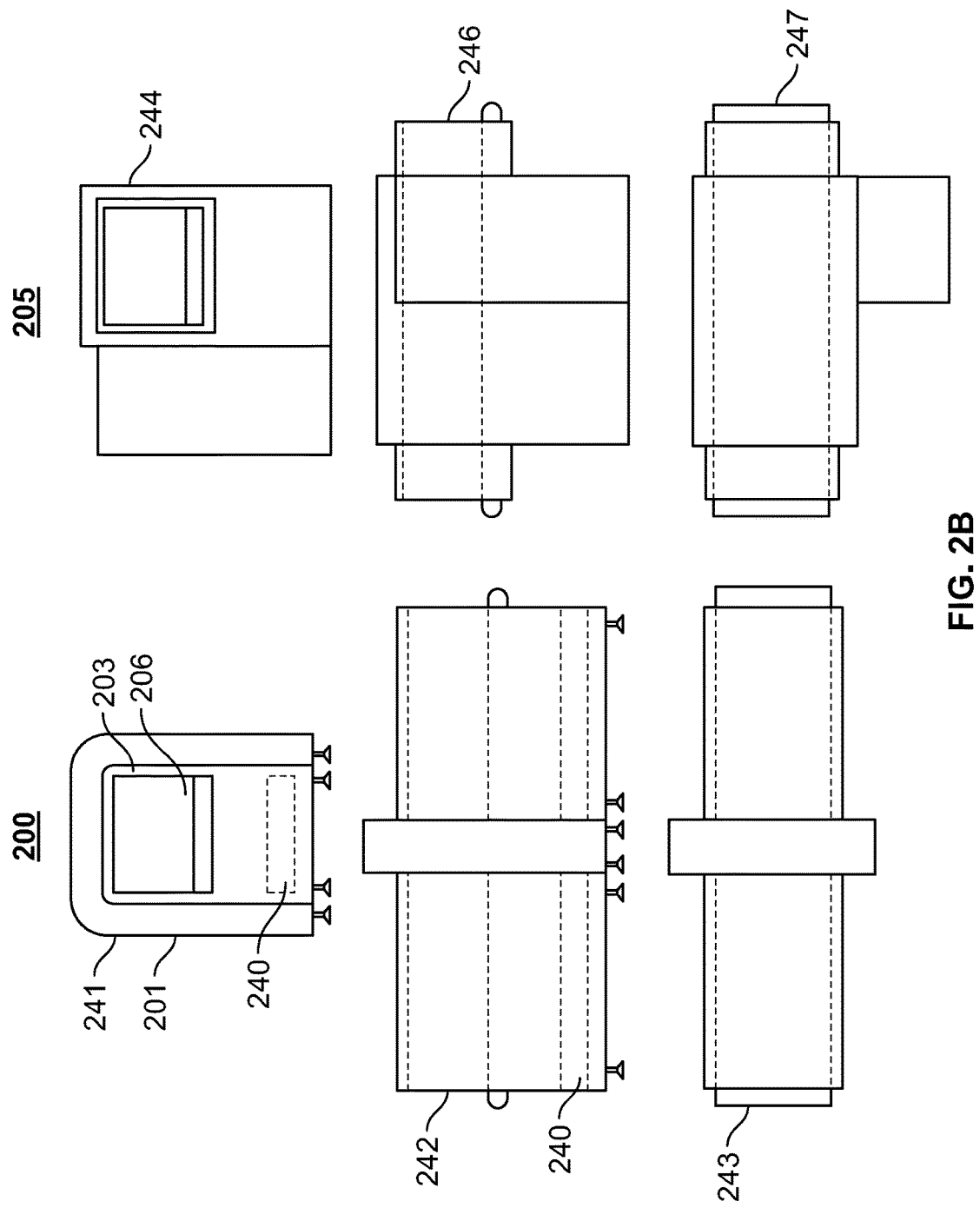
FIG. 2B is a schematic diagram illustrating a plurality of views of the scanning unit of FIG. 2A in comparison to a plurality of corresponding views of a conventional scanning unit.

FIG. 2B illustrates a plurality of views of the scanning unit 200 of the present specification illustrating a system having a smaller footprint yet the same inspection volume as a conventional scanning system 205. The smaller footprint is accompanied with the advantages of reduced power usage and reduced noise. Referring now to FIG. 2B, view 241 illustrates a first open end or scanning aperture 203 of the scanning system 200 for objects under inspection to enter the inspection region 206. In embodiments, the scanning aperture 203 and the inspection region 206 has a width ranging from 500 mm to 1050 mm and a height ranging from 300 mm to 1050 mm. In some embodiments, the scanning aperture 203 and thus, inspection volume 206, has a width of 620 mm and a height of 420 mm. View 244 is the equivalent view of the open end of conventional scanning system 205. In various embodiments, scanning unit seen in view 241 has width ranging from 800 mm to 1400 mm. Scanning system 205 seen in view 244 has a relatively greater width than scanning unit 200. View 242 is a side view (as seen from first side 245 of FIG. 2A) along a longitudinal direction of the scanning unit 200. View 246 is the equivalent side view of conventional scanning system 205. View 243 is a top view along the longitudinal direction of scanning unit 200 and view 247 is the equivalent top view of conventional scanning system 205. It should be noted that the longitudinal length of scanning system 200 as shown in view 243 is longer than that of scanning system 205 as shown in view 247 to accommodate for higher levels of X-ray scatter from the object under inspection which is caused by the higher beam current that is necessarily used to produce a clear image. Views 241, 242 also illustrate the space 240 through which tray can pass when integrated with an automatic tray return handling system.

Figure 2C:
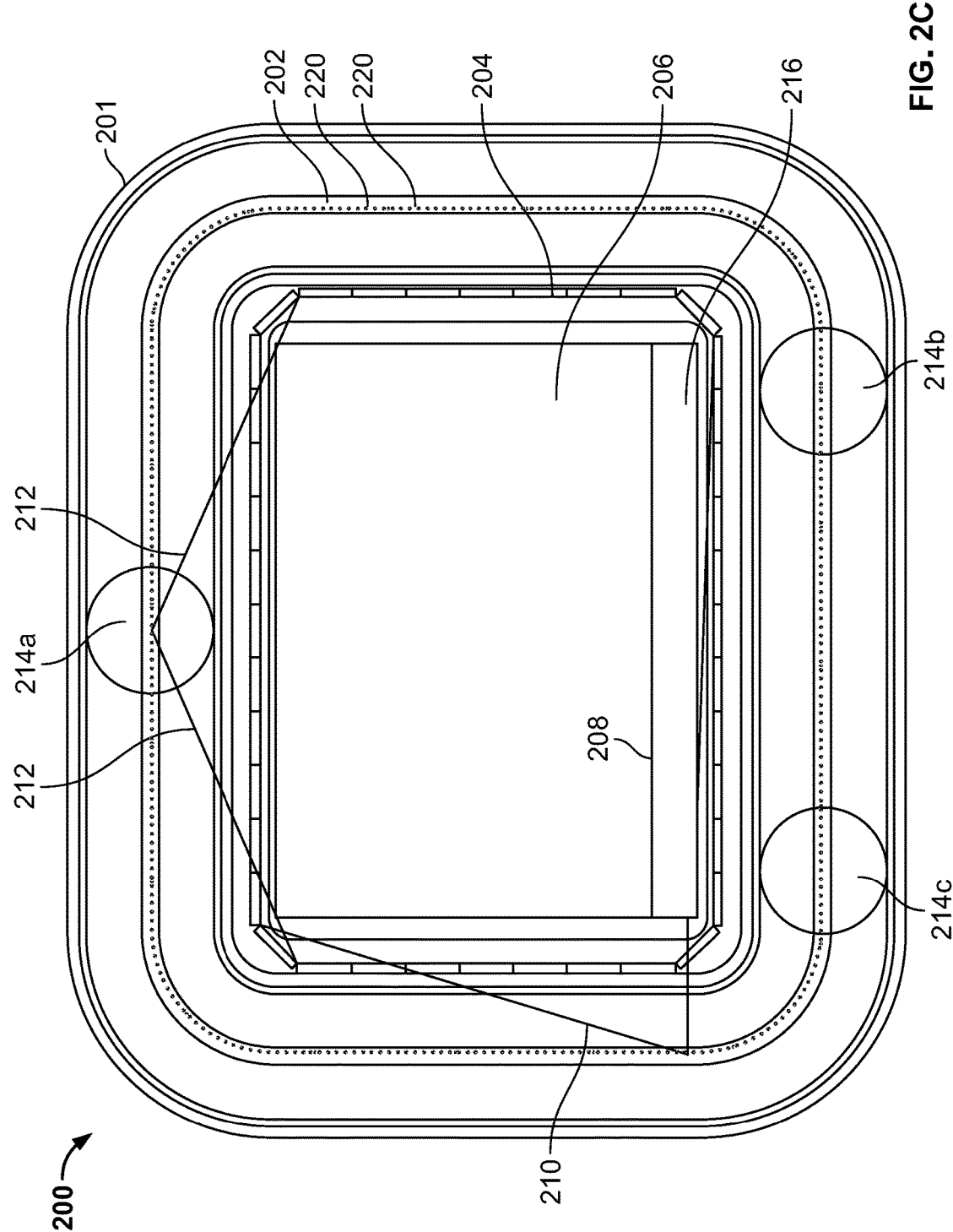
FIG. 2C is a cross-sectional view of a housing/enclosure of the scanning unit of FIG. 2A, comprising a plurality of X-ray sources points and detectors, arranged in a substantially rectangular shape around a scanning volume, in accordance with an embodiment of the present specification.
Figure 8A:
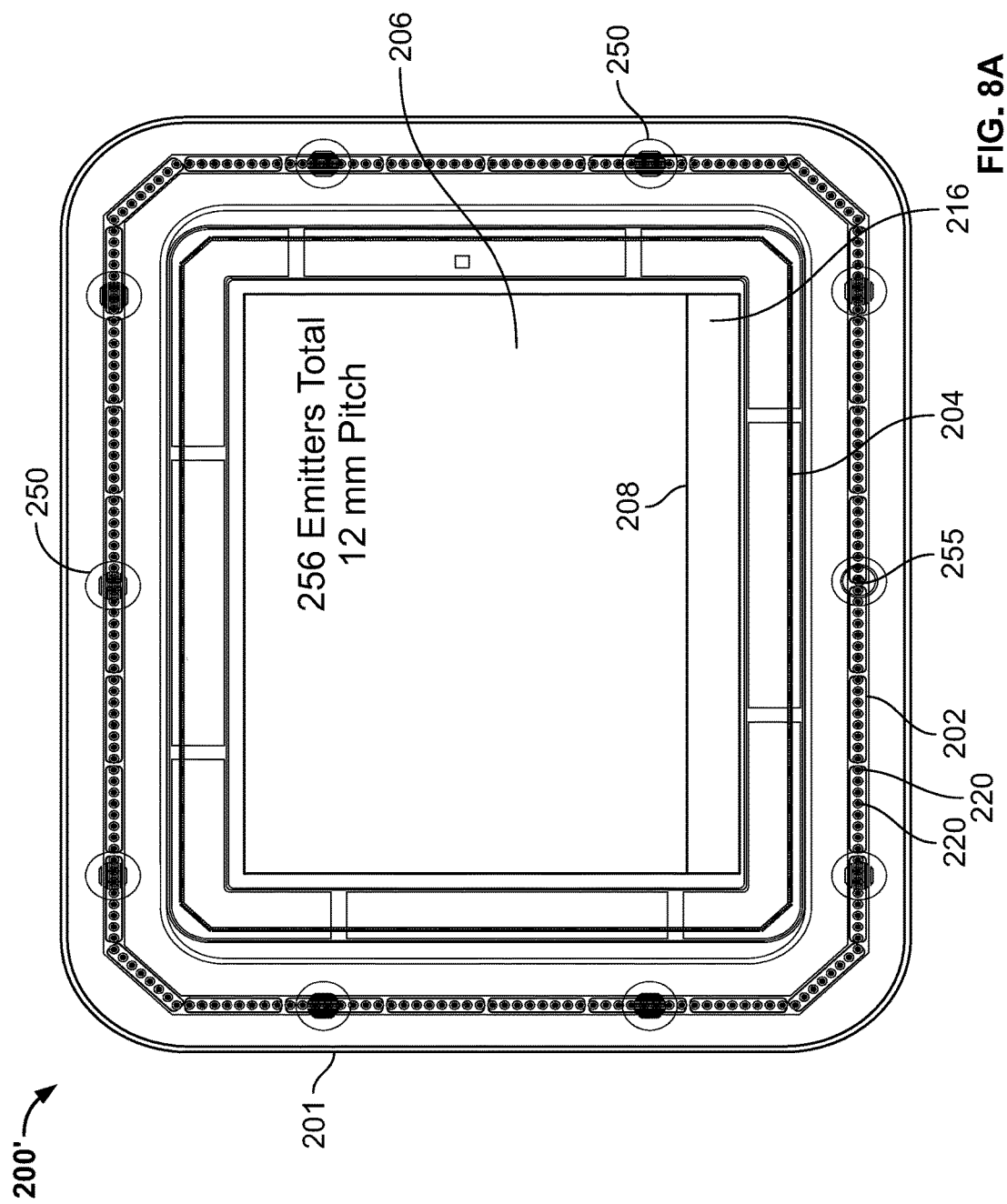
FIG. 8A is a cross-sectional view of the housing of the scanning unit of FIG. 2A, comprising a plurality of X-ray source points and detectors, arranged in a substantially rectangular shape around a scanning volume, in accordance with another embodiment of the present specification.

FIGS. 2C and 8A illustrate cross-sectional views of the housing 201 of the scanning units 200, 200' respectively, comprising a plurality of X-ray source points and detectors arranged in a substantially rectangular shape around a scanning volume, in accordance with first and second embodiments of the present specification. In various embodiments, the rectangular housing 201 has width ranging from 800 mm to 1400 mm and a height ranging from 600 mm to 1500 mm. In various embodiments, the housing 201 is configured to define an imaging volume or inspection tunnel 206, which is also rectangular, that has a width ranging from 500 mm to 1050 mm and a height ranging from 300 mm to 1050 mm. It should be appreciated that, in alternate embodiments, the plurality of X-ray source points and detectors can be arranged in other quadrilateral shapes, such as, but not limited to, a square shape. It should be appreciated that the rectangular, quadrilateral, or square shape may also have rounded edges and encompasses shapes known as rounded rectangles, squircles, or rectellipses.

Referring now to FIGS. 2C and 8A simultaneously, the scanning units 200, 200' respectively comprise a multi-focus X-ray source 202 and X-ray detector array 204 enclosed within housing 201. The source 202 comprises a large number of source points or electron guns 220 in locations spaced about the source 202, and arranged in a substantially non-circular, such as rectangular, geometry around an imaging or inspection volume 206, in accordance with an embodiment. In embodiments, the X-ray detector array 204 is positioned between the X-ray source points 220 and the imaging volume 206 such that the source points 220 and the detector array 204 surround the imaging volume 206.

A conveyor belt 208 carries objects/luggage to be inspected through the imaging volume 206 along a longitudinal axis of the scanning units 200, 200'. In an embodiment, the conveyor belt 208 has a speed of 0.5 m/s which is about twice the speed of conventional X-ray systems that typically operate at a speed of about 0.25 m/s and is about three times the speed of conventional rotating gantry systems that typically operate at a speed of about 0.15 m/s. In various embodiments, the conveyor belt 208 has a speed ranging from 0.1 m/s to 1.0 m/s. Both feed and return conveyor loops pass through the base 216 of the imaging volume 206, having a depth of approximately 50 mm while space 240 (approximately 200 mm deep and having a width equal to that of the base 216 of the imaging volume 206) is reserved in the base of the scanning units 200, 200', to accommodate automated return of trays when integrated with an automatic tray return handling system, in accordance with some embodiments. The conveyor and feed return loops both pass through base 216 of imaging volume 206. In contrast, trays that have been conveyed through the inspection or imaging volume 206 by the conveyor 208 are returned back through region 240, which ranges from 100 mm to 300 mm deep and is preferably 200 mm deep.

In various embodiments, the rectangular housing 201 has width ranging from 800 mm to 1400 mm and a height ranging from 600 mm to 1500 mm. In embodiments, the housing 201 has a maximum width of 920 mm and a maximum height of 720 mm. In various embodiments, the housing 201 is configured to define an imaging volume or inspection tunnel 206, which is also rectangular, that has a width ranging from 500 mm to 1050 mm and a height ranging from 300 mm to 1050 mm. In some embodiments, the housing 201 is configured to define an imaging volume or inspection tunnel 206 that is approximately 620 mm in width and approximately 420 mm in height.

In an embodiment, as shown in FIG. 2C, X-ray source 202 comprises 256 electron guns 220, grouped in units of 16, substantially equidistantly spaced around the imaging volume 206 on a 12 mm pitch (that is, a center-to-center spacing between adjacent electron guns is 12 mm). In various embodiments, the X-ray source 202 comprises 64 to 2048 electron guns grouped in 4 to 32 units of electron guns. In various embodiments, the electron guns 220 are spaced on a pitch ranging from 10 mm to 14 mm. In this configuration, every emission source point has a different field of view (FOV). In various embodiments, the X-ray sources emit fan beams which have different beam angles based on the location of the X-ray source points with respect to the imaging volume.

Figure 8B:
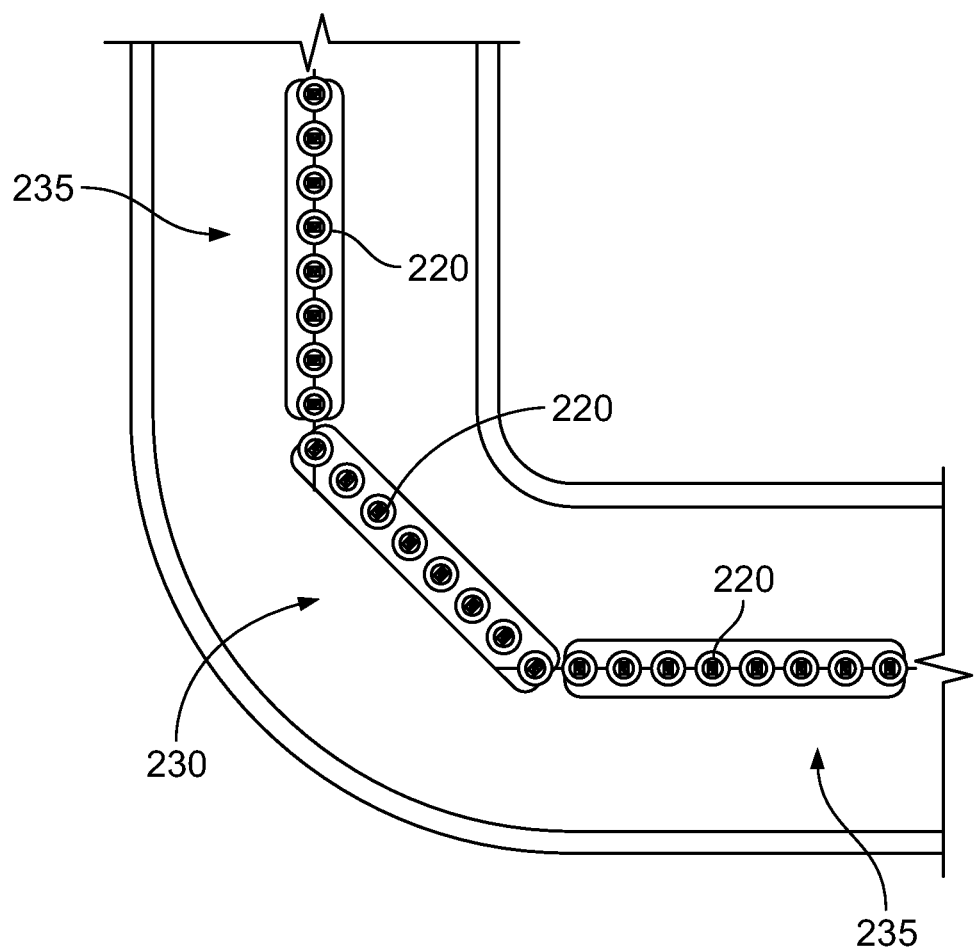
FIG. 8B illustrates a plurality of electron gun source points, arranged in a corner section layout having an adjacent straight section layout on either side, representing a portion of the scanning unit shown in FIG. 8A, in accordance with an embodiment of present specification.

In another embodiment, as shown in FIG. 8A, the X-ray source 202 comprises 256 electron guns 220 spaced on a 12 mm pitch (that is, a center-to-center spacing between adjacent electron guns is 12 mm), grouped in units of 8, equidistantly spaced around the imaging volume 206. In various embodiments, the X-ray source 202 comprises 64 to 2048 electron guns grouped in 4 to 32 units of electron guns. In various embodiments, the electron guns 220 are spaced on a pitch ranging from 10 mm to 14 mm. FIG. 8B illustrates a partial break-away view of a corner section layout 230 comprising a plurality of X-ray source points 220 flanked on either side by an adjacent straight section layout 235 of electron guns 220, grouped in units of 8 in accordance with the embodiment shown in FIG. 8A. Each electron gun 220 of the X-ray source 202 emits a fan beam of X-rays having a different field of view (FOV). In various embodiments, the X-ray sources emit fan beams which have different beam angles based on the location of the X-ray source points with respect to the imaging volume.

Conventional RTT systems with the source points arranged in a circular geometry have the same X-ray beam angle or angle of coverage emanating from each source point. In the configurations shown in FIGS. 2C, 8A, and 8B, the beam angles are different for different source points, owing to the different distances from each source point to detector element in the beam path. In embodiments, a substantially rectangular field of view is reconstructed for a rectangular inspection tunnel region. Specifically, closer to the edges, the beam angle made by the emitted X-rays 210 is more narrow while closer to the middle of the scanning volume 206, the beam angle made by the emitted X-rays 212 is broader. In some embodiments, the beam angles range from approximately 60 degrees to 120 degrees.

Figure 8C:
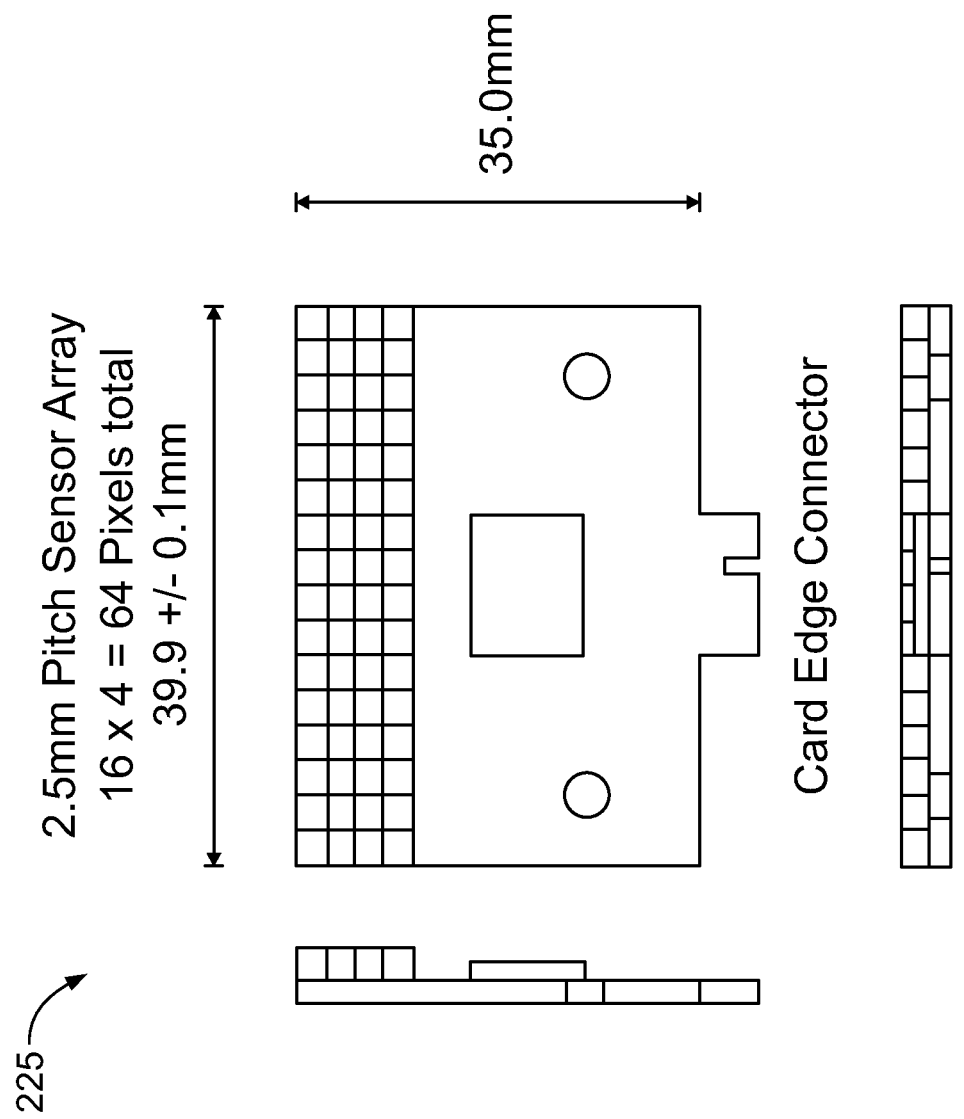
FIG. 8C illustrates a multi-energy sensor in a 16×4 pixel array, in accordance with an embodiment of the present specification.

In an embodiment, as shown in FIG. 8A, the X-ray detector array 204 comprises 64 multi-energy detector modules (energy bins) or segments each having a 16×4 pixel sensor configuration on a 2.5 mm pixel pitch (that is, a center-to center spacing between adjacent detector elements or sensors). FIG. 8C illustrates a 16×4 pixel multi-energy sensor 225 in accordance with an embodiment of the present specification. The sensor 225 is capable of detecting individual interacting photons with an intrinsic resolution of at least 5 keV and incident photon count rate of at least 5 Mcps/mm$^2$/s. In embodiments, the detected photons are allocated into one of 2 to 64 programmable energy bins to provide accurate Z-effective measurement in the subsequent image reconstruction algorithms. In some embodiments, the detected photons are allocated into one of six programmable energy bins. In an embodiment, the energy extents or windows of each of the six programmable energy bins are, respectively, 25 keV, 40 keV, 55 keV, 65 keV, 100 keV, 160 keV. The energy extents or windows of each of the six programmable energy bins are customizable, in various embodiments, to optimize Z-effective accuracy. In various embodiments, the energy extents or windows of each of the six programmable energy bins ranges from 15 keV to 200 keV.

In an embodiment, each of the 64 multi-energy detector modules or segments of the X-ray detector array 204 has a length of 60 mm. The 64 multi-energy detector modules or segments form a rectangular ring or detector array 204 around the imaging volume 206, as shown in FIG. 8A. In embodiments, the substantially square detector array 204 enables reduction of the overall height of the scanning unit 200' such that an operator and passenger can have eye level contact with each other while the passenger's baggage is being inspected.

As shown in FIG. 2C, a plurality of support means 214a, 214b, and 214c, positioned at points along the periphery of the imaging volume 206, are provided for supporting the X-ray source 202. In an embodiment, the support means 214b and 214c are also used to provide coolant and power to the X-ray source 202 and the scanning system 200, respectively.

Referring back to FIG. 8A, a plurality of first structures 250 for enabling heat dissipation and at least one second structure 255 for enabling heat dissipation and for providing voltage supply is shown. FIG. 8D is a cross-sectional view of one of the plurality of first structures 250 and the at least one second structure 255 along with respective top views 250' and 255', in accordance with embodiments of the present specification. Referring now to FIGS. 8A, 8C and 8D, simultaneously, the plurality of first structures 250 include a thermally conductive element 251 to dissipate heat from the anode region 252 (FIG. 8D). In embodiments, the thermally conductive element 251 is fabricated from ceramic. In embodiments, the first structure 250 is designed to maximize mechanical integrity and heat conductivity. The at least one second structure 255 comprises a thermally conductive element 253, also fabricated from ceramic, to dissipate heat from the anode region 254 and also a metal rod 256 that passes through its center to supply voltage. Both thermally conductive elements 251 and 253 include a plurality of fins 258 along the height on either side to enable heat to dissipate into the air. It should be appreciated that, in some embodiments, the use of the first and second structures 250, 255 obviates the need for circulating coolant to cool the electron guns. This in turn, reduces overall complexity and cost of manufacturing the electron guns.

In various embodiments, the thermally conductive elements 251, 253 are manufactured using AlN (Aluminum Nitride) ceramic electrical insulators to provide direct thermal transfer from the anode to ambient air. As shown in FIG. 8A, in some embodiments, the plurality of first structures 250 are strategically positioned along the perimeter of the source 202 such that each first structure 250 pulls heat from a section of a plurality of electron guns 220. In some embodiments, each first structure 250 pulls heat from 32 electron guns 220. In different embodiments, different combinations and numbers of first structure 250 and second structure 255 are deployed. In one embodiment, a total of ten structures are employed comprising nine first structures 250 and one second structure 255. In an embodiment, the ten structures are equidistantly spaced about the source periphery. In embodiments, an equal number of structures are positioned along each side of the non-circular perimeter of the source. In some embodiments, the non-circular perimeter is a rectangle, with two equal and opposing sides of a first length, and the other two equal and opposite sides of a second length, where the first length is greater than the second length. In one embodiment, a greater number of structures 250, 255 is deployed along the sides having a first length than the sides having a second length. In an embodiment, the first and second structures are welded into the housing 201. In accordance with an embodiment, each of the first and second structures is configured to dissipate 64 watts of heat energy to air, on average.

Figure 8E:
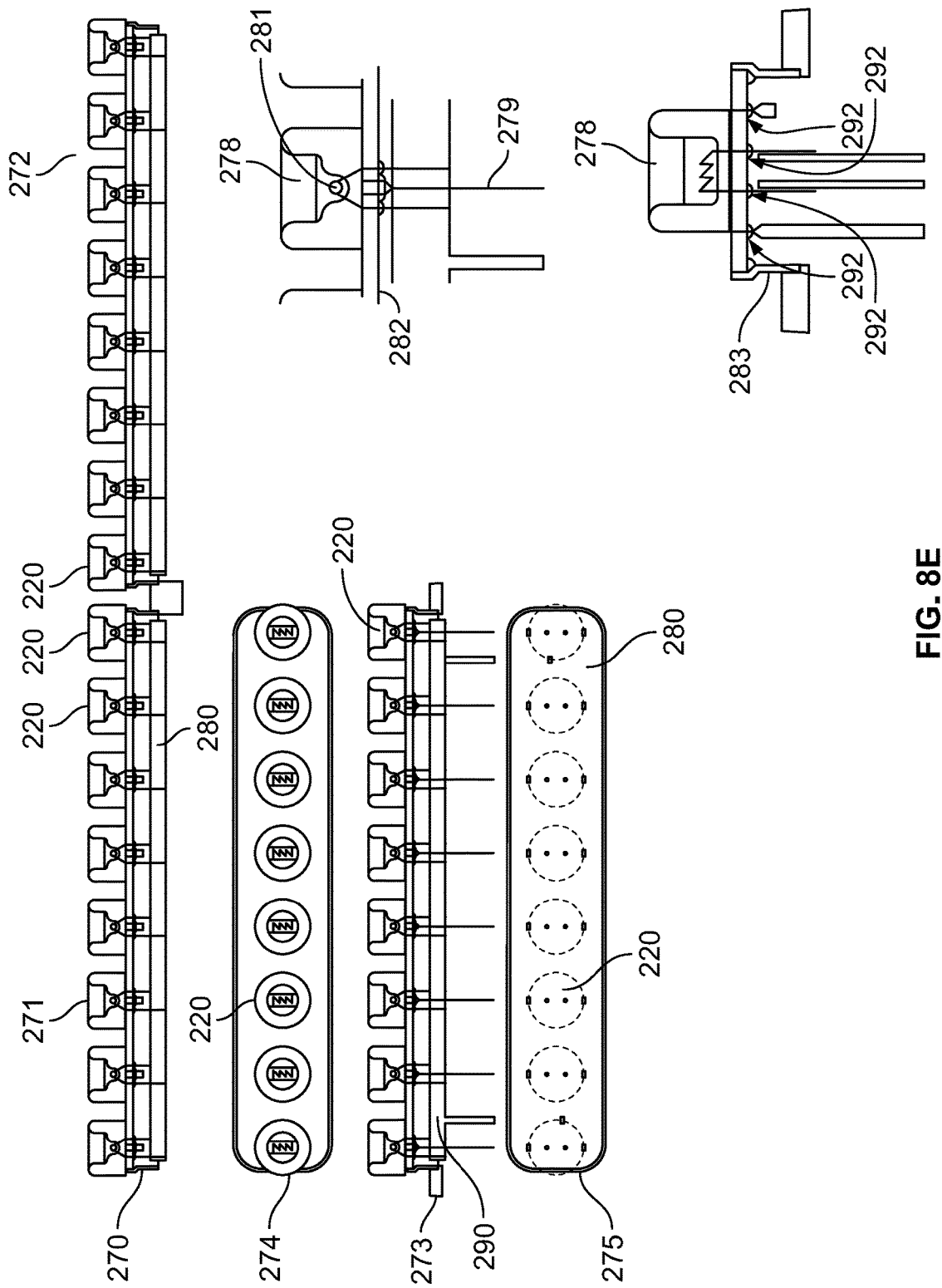
FIG. 8E is an expanded layout view of a plurality of X-ray source points or electron guns, of a multi-focus X-ray source, in accordance with some embodiments.

FIG. 8E illustrates various views of at least a portion of the plurality of X-ray source points or electron guns 220 of the multi-focus X-ray source 202 (of FIGS. 2C and 8A), in accordance with some embodiments. As shown, view 270 illustrates first and second adjoining X-ray source modules 271, 272 each comprising a grouping or segment of 8 electron guns 220. In one embodiment, 2 to 20 electron guns are integrally formed and positioned on, or into, a single common substrate 280. A top (vacuum side) view 274 of an emitter assembly or X-ray source module 271 shows a substrate comprising 8 individually controllable electron guns 220. A side section view 273 shows the same 8 electron guns 220 with an underlying power bus bar 290 to supply power to the individual filaments in parallel. A bottom (air side) view 275 for the same module 271 shows the 8 electron guns 220 mounted into a common insulating substrate 280. Views 282 and 283 are exploded views of one electron gun 220.

Referring now to views 275, 282 and 283, in embodiments, a focusing and grid control cup 278 is manufactured from nickel by stamping a sheet of nickel using a power-press. A leg 279 extends downwards from the stamped nickel cup 278. The leg 279 is twisted 90 degrees to lock the cup 278 in place once positioned into ceramic substrate 280. In some embodiments, the ceramic substrate 280 is brazed onto a nickel or copper ring. A filament 281, comprised of tungsten wire, is connected through the ceramic substrate 280. In embodiments, glass frits 292 (that are finely powdered glasses that when re-heated sinter, soften, and flow to form a seal or a coating) are used to form metal to ceramic seals. The use of nickel for the cup 278 and tungsten for the filament 281 enables overall cost optimization of manufacturing the X-ray source 202 (of FIG. 8A). The modules, such as modules 271 and 272 are brazed onto the housing 201 of the multi-focus X-ray source 202 (of FIG. 8A).

Figure 3A:
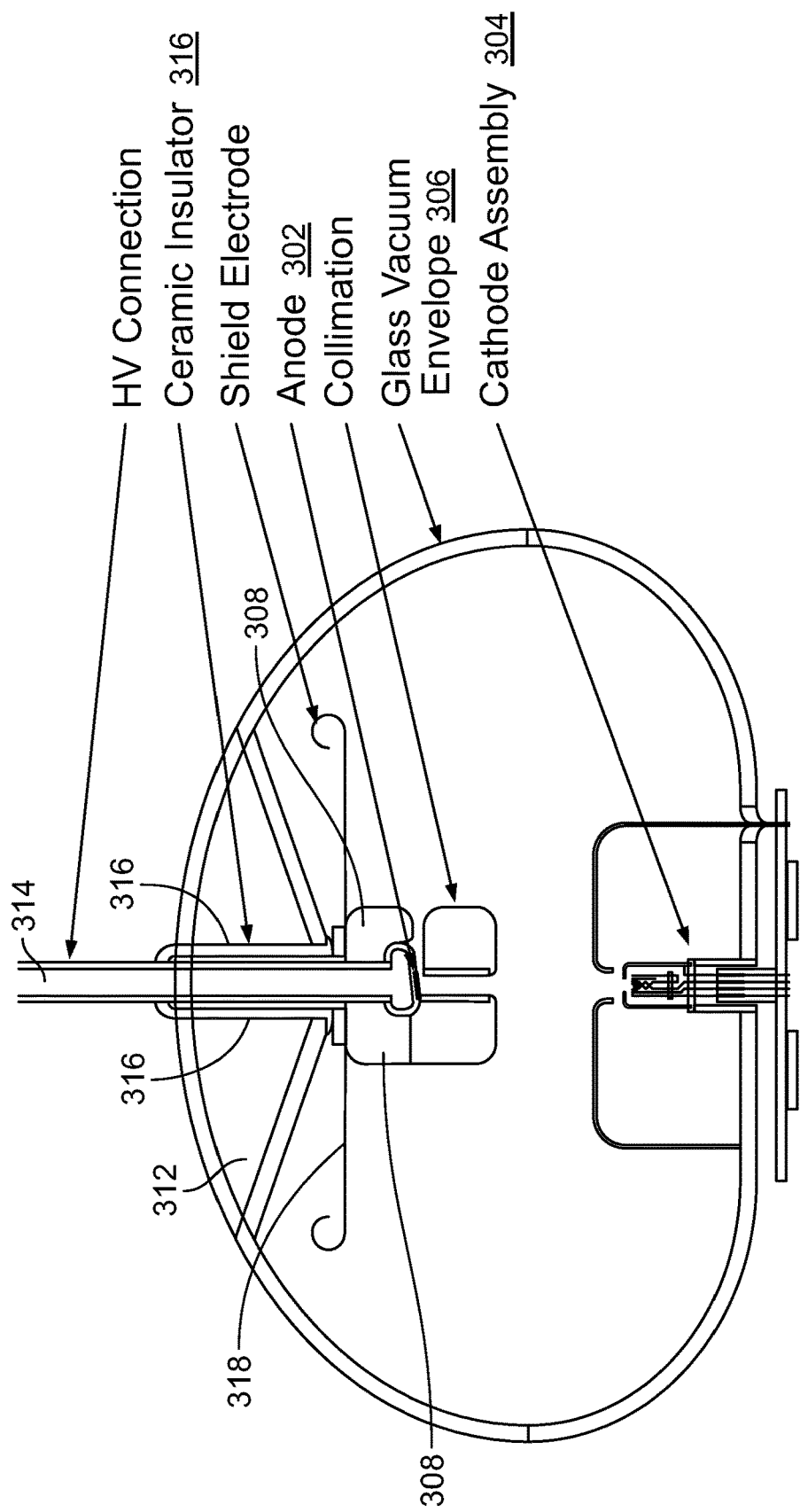
FIG. 3A illustrates an X-ray source sealed within a glass envelope, in accordance with an embodiment of the present specification.

FIG. 3A illustrates a cross-section of an X-ray source sealed within a glass envelope, in accordance with some embodiments of the present specification. In an embodiment, the anode and cathode of an X-ray source generating X-rays are machine-built and installed onto a glass base. Next, the base is sealed with a glass top by using glass melting techniques, thereby resulting in an anode 302 and a cathode 304 enveloped in a glass vacuum envelope 306. In an embodiment, the cathode 304 is modular. In various embodiments, the thickness of the glass envelope 306 is uniform in all portions of the body of the glass envelope 306. In an embodiment, the thickness of the glass envelope 306 ranges between 0.5 mm to 5 mm. In an embodiment, the thickness of the glass envelope 306 is 1 mm+/−0.3 mm. Since, glass as a transmission material provides a lower X-ray absorption (low Z material), the source design illustrated in FIG. 3A provides improved material discrimination. In embodiments the anode 302 is supported in a manner that accounts for differences in thermal expansion between the glass envelope 306 and the anode metal. Blocks 308 provided atop the anode 302 and shield electrode 318 are, in an embodiment, a slip coupling that accounts for thermal expansion. The slip coupling blocks 308 are attached directly to the glass envelope 306 just underneath a "depressed" region 312, as shown in FIG. 3A. As the glass envelope 306 changes shape/volume due to heat generated by the generation process of X-rays, the expansion is accounted for by movement of the slip coupling mechanism. The anode 302 is connected to a high voltage (HV) power source via a copper tube 314. In an embodiment, the slip coupling blocks 308 are each respectively attached to depressed region 312 at a distal end and to the anode 302 at a proximal end. In an embodiment, the slip coupling blocks 308 are also attached to the copper tube 314 along at least one side as shown in FIG. 3A. The slip coupling blocks 308 have a three point connection, thereby allowing for expansion while not allowing swinging or lateral movement. Ceramic or glass tubes 316 act as insulating standoff elements for the shield electrodes 318 that shield the HV connections and tubes from the generated X-rays.

Figure 3B:
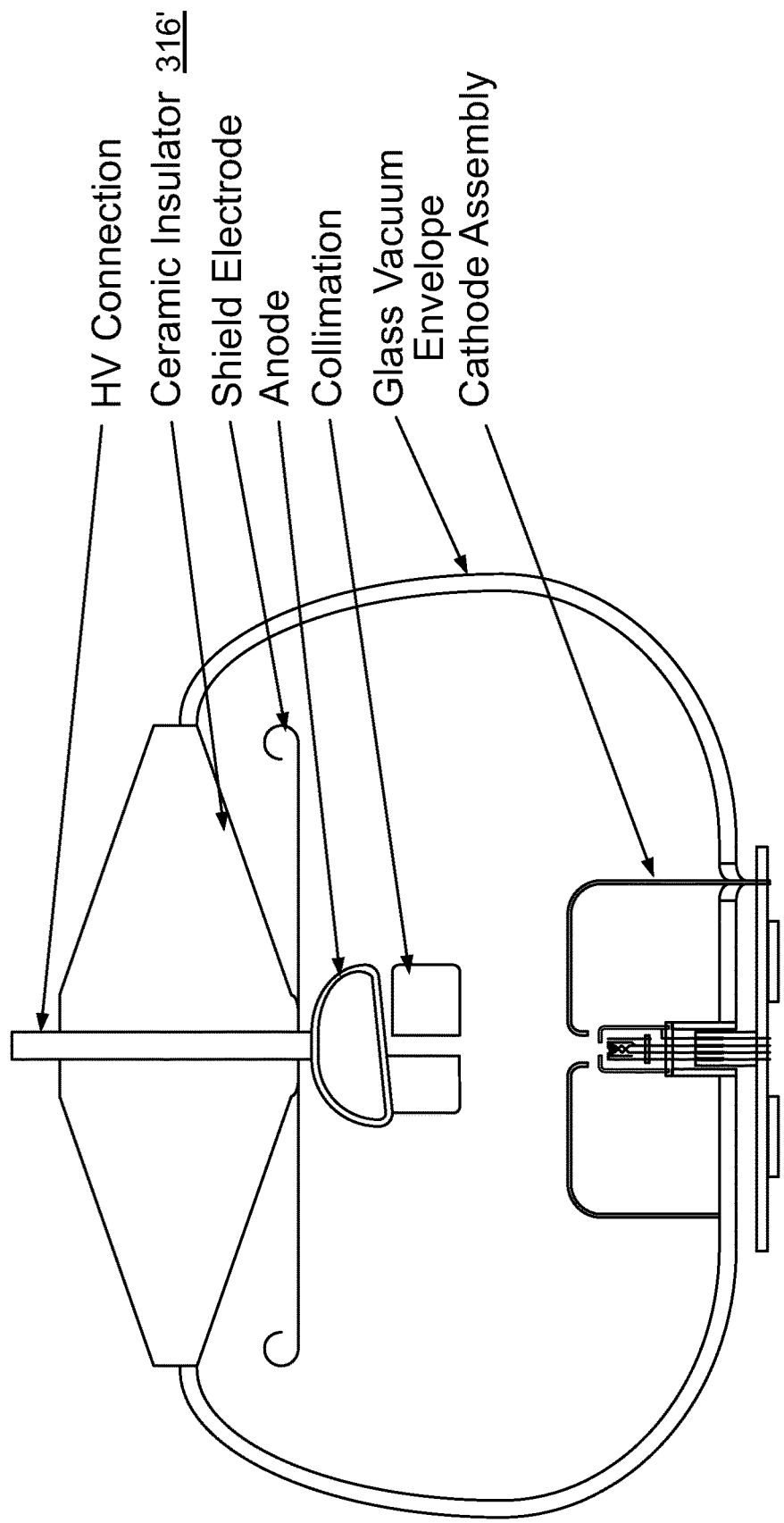
FIG. 3B illustrates an X-ray source sealed within a glass envelope, in accordance with an embodiment of the present specification.

FIG. 3B illustrates another view of the X-ray source sealed within a glass envelope, in accordance with an embodiment of the present specification. In this embodiment, a ceramic insulator 316' is used to seal the X-ray source once positioned on a glass assembly. The ceramic insulator 316' is a bulk insulator which is attached to the glass rather than relying on the glass envelope itself. This enables the X-ray source to be more tolerant to HV breakdown while also making the glass envelope more robust. As a result, the embodiments shown here do not require separate cooling channels.

FIG. 4A illustrates a cathode assembly, in accordance with an embodiment of the present specification. Cathode assembly 400 is enclosed in the glass envelope 306 as shown in FIG. 3A and comprises a printed circuit board 402 into which the elements of the cathode are plugged. Cathode assembly 400 further comprises a grid 404, a dispenser cathode 406 and a filament 408 coupled with and partially encased by a primary focus electrode 410 via a glass feed-through element 412. The cathode assembly 400 also comprises a secondary focus electrode 414.

In various embodiments, the cathode assembly 400 of the inspection system is provided with a secondary electrode 414, which absorbs any flash of energy within the cathode 400. The secondary electrode 414 is held at ground potential and acts as a trap or buffer that captures electrons that would otherwise leak in cases of a short circuit within the cathode assembly 400. The distance from the dispenser cathode 406 to grid 404 is calibrated to maintain a predefined gap exactly uniform across all cathodes. The dispenser 406 generates electrons that form a cloud around it. By keeping the gap small, an effective space charge limited region is created, which acts as the gate keeper, letting out only a predefined number of electrons at a time.

In an embodiment, the cathode assembly 400 is precision manufactured in volume. The core cathode is built with high tolerances using robots. In an embodiment, the secondary focus electrode 414 is not part of the precision manufacturing and is added to the assembly separately. In an embodiment, a glass support for the cathode is brazed to glass envelope 306 (shown in FIG. 3A).

Figure 4C:
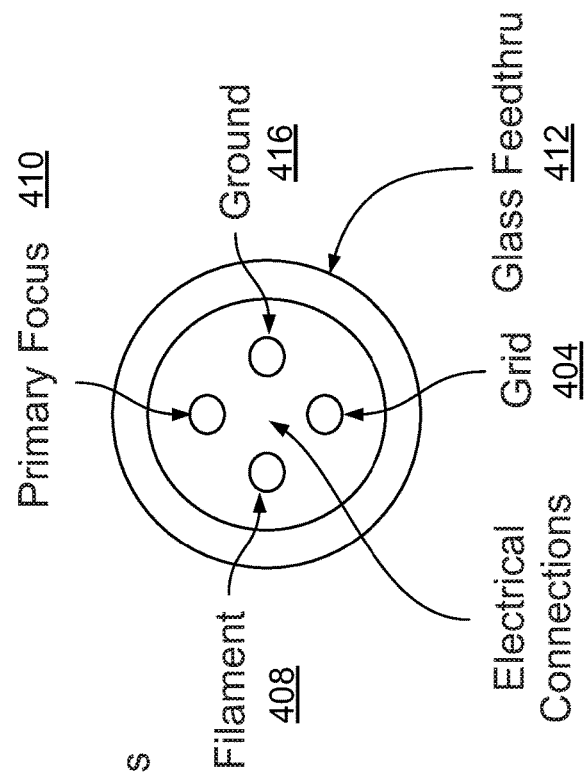
FIG. 4C is a top plan view of the cathode assembly shown in FIG. 4B.
Figure 4B:
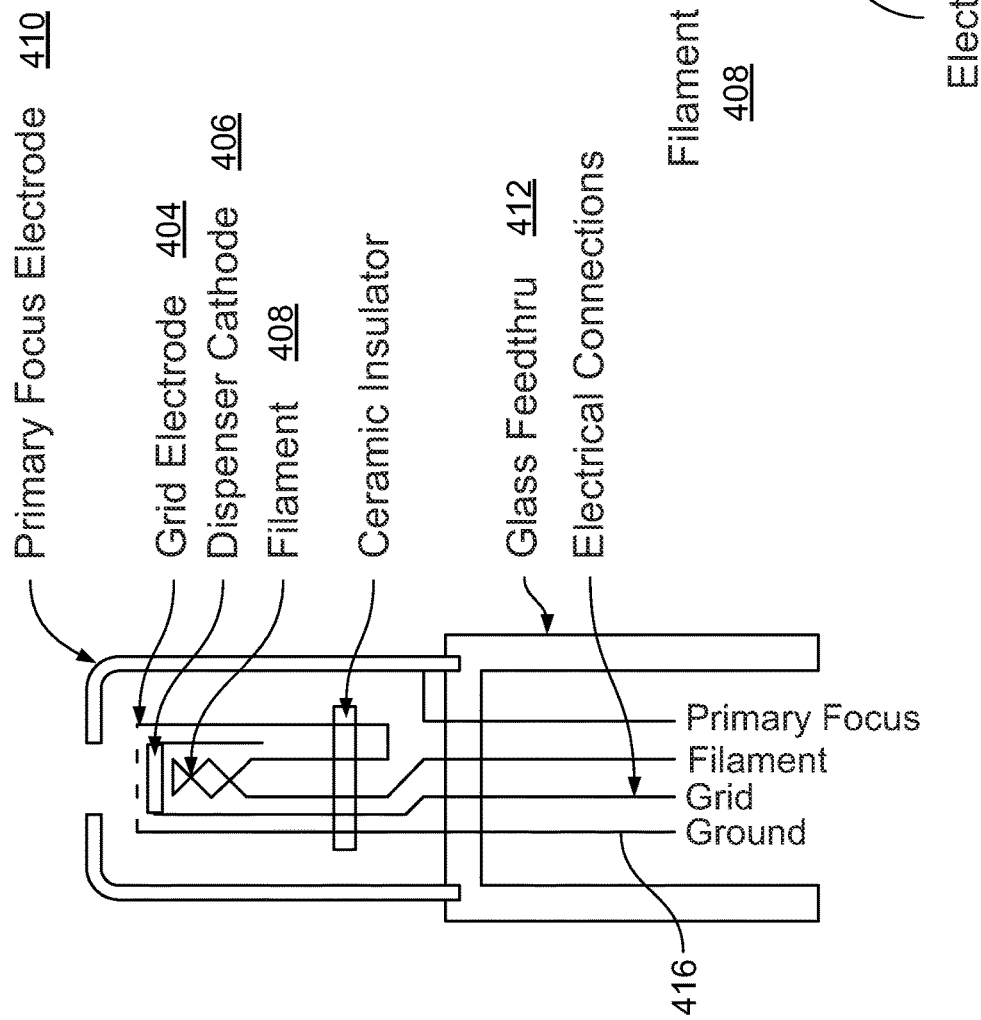
FIG. 4B is an exploded view of the cathode assembly shown in FIG. 4A.

FIG. 4B is an exploded view of the elements of the cathode assembly shown in FIG. 4A. FIG. 4C is a top plan view of the elements of the cathode assembly shown in FIG. 4B. Referring to FIGS. 4A, 4B and 4C, electrical connections from each of the primary focus electrode 410, grid 404, filament 408 along with a ground connection 416 placed within the glass feedthrough element 412 are plugged into the circuit board 402.

Figure 13:
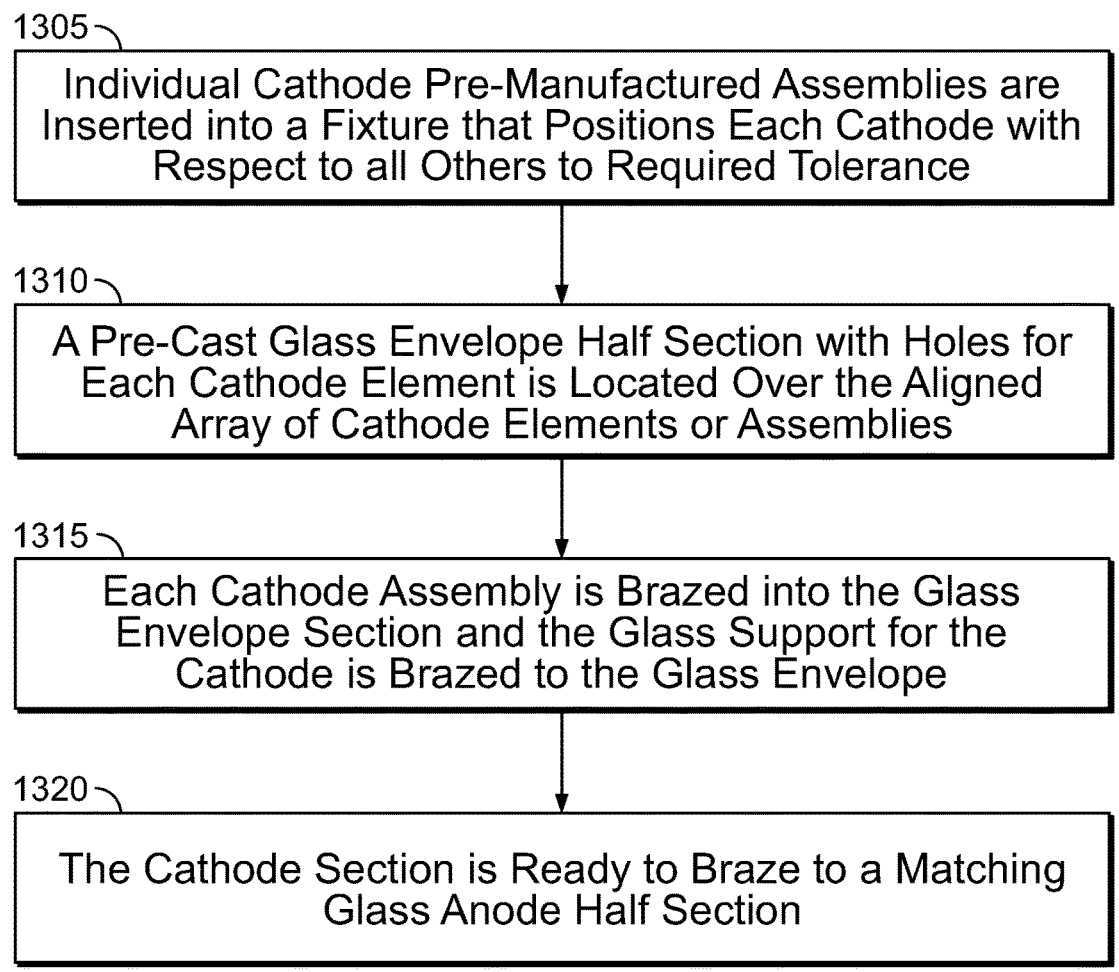
FIG. 13 is a flow chart of a plurality of exemplary steps of a method of manufacturing the cathode assembly of FIG. 4A.

FIG. 13 is a flow chart of a plurality of exemplary steps of a method of manufacturing the cathode assembly 400 of FIG. 4A. At step 1305, individual cathode pre-manufactured assemblies are inserted into a fixture that positions each cathode with respect to all others to required tolerance. Each cathode plugs into a printed circuit board. At step 1310, a pre-cast glass envelope half section with holes for each cathode element is located over the aligned array of cathode elements or assemblies. Thereafter, at step 1315, each cathode assembly is brazed into the glass envelope section and the glass support for the cathode is brazed to the glass envelope. Finally, at step 1320, the cathode section is ready to braze to a matching glass anode half section.

FIG. 5A illustrates a top view of a cathode array, in accordance with an embodiment of the present specification. Array 500 comprises a plurality of cathode assemblies 502, each comprising a grid, a dispenser cathode and a filament coupled with and partially encased by a primary focus electrode via a glass feedthrough element, as shown in FIG. 4A. FIG. 5B illustrates a bottom view of the cathode array shown in FIG. 5A, in accordance with an embodiment of the present specification. FIG. 5C illustrates another view of the cathode array shown in FIG. 5B. The two lines 504 represent a secondary electrode, which in an embodiment is stamped out and laser cut with holes in the middle for accommodating the cathode array 500.

Figure 6:
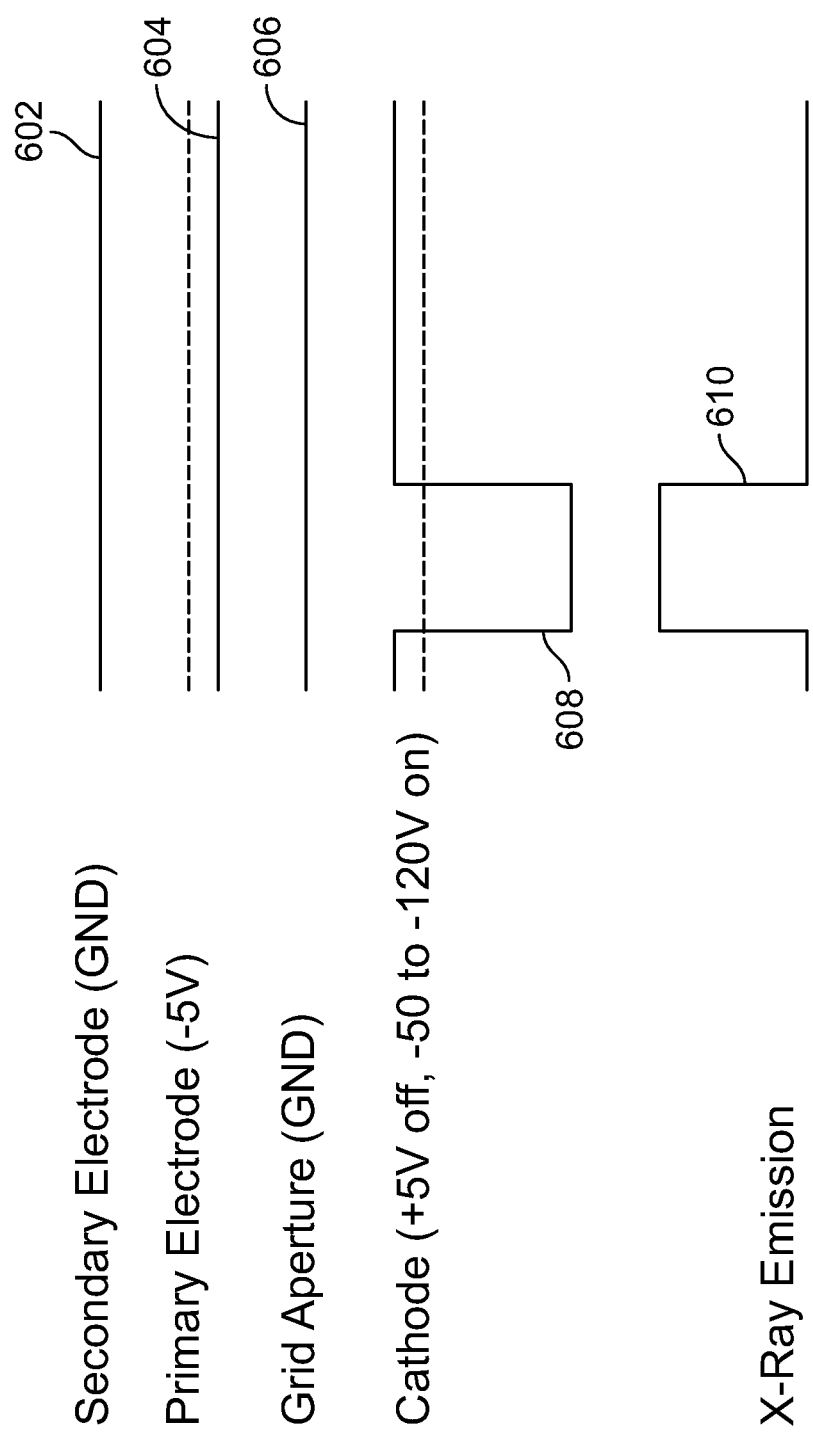
FIG. 6 illustrates a grid control sequence of the elements of an X-ray source, in accordance with an embodiment of the present specification.

FIG. 6 illustrates a grid control sequence of the elements of an X-ray source, in accordance with an embodiment of the present specification. Curves 602, 604, 606, and 608 represent the voltages maintained across a secondary electrode, a primary electrode, a grid aperture, and a cathode respectively. In various embodiments, the primary and secondary electrodes control the electron beam focusing on the target. As shown, the secondary electrode is maintained at a ground potential and the primary electrode is set to −5V to mitigate against any short circuit between the grid aperture and cathode. The grid aperture defines a space charge limited operating region around the cathode and sets the base electron gun potential to ground potential. The cathode is the main potential switched component and acts to control overall electron gun emission. As shown, the potential maintained across the cathode in an off position is +5V and ranges from −50V to −120V in an on position. Curve 610 represents the X-ray emission which follows the cathode potential. In embodiments, the X-ray emission is inversely proportional to the cathode potential. The more negative the cathode potential, the greater the beam current and the brighter the X-ray emission.

Figure 7A:
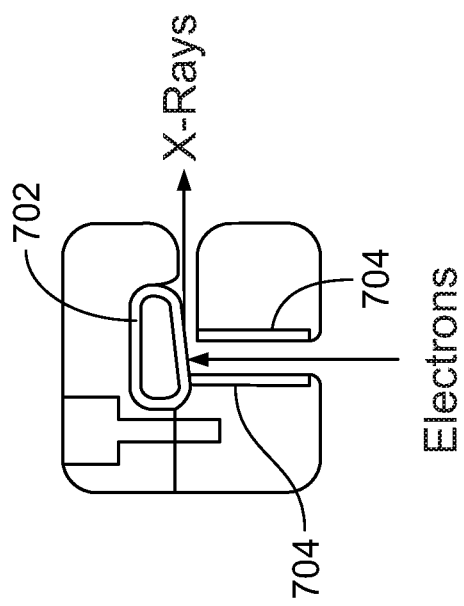
FIG. 7A is a plan view of an anode of an X-ray source assembly, in accordance with an embodiment of the present specification.

FIG. 7A illustrates an anode of an X-ray source assembly, in accordance with an embodiment of the present specification. In an embodiment, anode 702 is formed from a copper tube containing coolant within a stainless steel collimating structure. In an embodiment, a coolant tube (such as the copper tube 314 shown in FIG. 3A) is molded to form an anode/target in a source assembly of the inspection system of the present specification. In an embodiment, the coolant tube is molded by using hydroforming, wherein a large quantity of water is pumped into the tube to cause it to expand to the shape of a mold. A predefined material is then introduced into the beam of a flame and a fan is used to blow it onto the tube, to cause a spray coating of the material onto the interior walls of the tube. In an embodiment, in order to obtain a coating of a low Z material, the material used is silicon carbide. Further, in an embodiment, Tungsten is used to create predefined patterns on the silicon carbide coating.

Figure 7B:
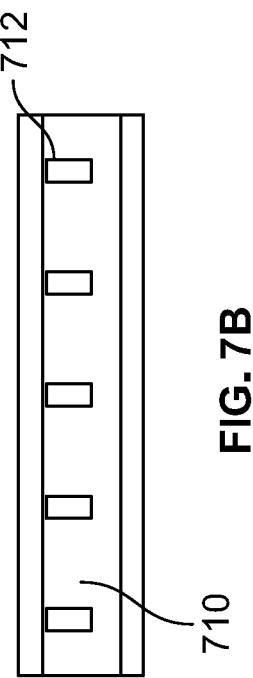
FIG. 7B is a plan view of a patterned anode surface, in accordance with an embodiment of the present specification.
Figure 7C:
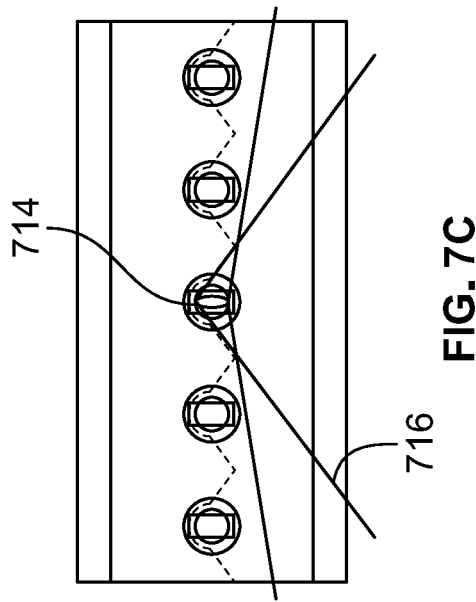
FIG. 7C is a plan view of a patterned anode surface, in accordance with another embodiment of the present specification.

In an embodiment, side walls 704 of electron entry path are coated with graphite tubes or a thick silicon carbide coating. In various embodiments, the surface of the anode 702 which faces the cathode is coated with a plurality of materials to obtain patterned anode surfaces. FIG. 7B illustrates a patterned anode surface, in accordance with an embodiment of the present specification. As shown in FIG. 7B, the anode surface 710 is coated with silicon carbide and then patterned with tungsten rich tungsten carbide stripes 712. FIG. 7C illustrates a patterned anode surface, in accordance with another embodiment of the present specification. A raised portion 714 is added to the anode surface 710 to define fan-shaped apertures for the X-ray beam 716 to emerge from. The anode surface 710 combines the X-ray forming region with beam forming region to limit the radiation dose from the X-ray tube as well as to mitigate against off-focal radiation. In an embodiment, the entire anode assembly and not just the surface facing the cathode is coated with silicon carbide to minimize off-focus X-ray emission. In another embodiment, specific predefined regions of the anode are coated with tungsten carbide to define regions of X-ray emission.

Referring back to FIGS. 2A, 2C, 8A, it should be appreciated that in contrast to conventional rotating gantry systems, the firing pattern for the multi-focus X-ray source 202 is not constrained to move in a standard helical rotation about a baggage under inspection. Thus, in various embodiments, the source firing pattern may be fixed or random with uniform or non-uniform dwell time at each source point 220. In various embodiments, the dwell time ranges from 50 μs to 500 μs per scan projection. In some embodiments, the dwell time is 200 μs per scan projection.

In various embodiments, in order to determine substantially accurate measures for Z-Effective and Density in the reconstructed RTT images, both sinogram data (the multi-energy "raw" data produced by the X-ray detectors for each source projection) and the reconstructed image data from one or more multi-energy bins is used in determining threat type for each object segmented from the 3D image data. In embodiments, the reconstructed image is available as soon as the trailing edge of a conveyor tray leaves the RTT imaging region of the scanning units 200, 200'.

In accordance with some embodiments, the scanning units 200, 200' are respectively configured to achieve reconstructed image voxels of 0.8 mm×0.8 mm×0.8 mm over an inspection tunnel size of 620 mm wide×420 mm. This is equivalent to a slice image size of 775 pixels (width)×525 pixels (height). For a conveyor tray length of 0.8 m, there will be 1,000 slices in each 3D image. In some embodiments, the RTT system spatial resolution is 1.0 mm at the center of the inspection tunnel. In embodiments, the RTT system is configured to achieve Z-effective resolution of +/−0.2 atomic numbers with density resolution at the center of the inspection tunnel of +/−0.5%.

FIG. 9 is a cross-sectional view, through the imaging volume, of the scanning unit 900 (or the scanning unit 200' of FIG. 8A). Isolated electron guns or source points 920 are illustrated on opposite sides of the scanning or inspection volume 906. X-ray beams 915 enter the imaging volume 906 and have a crossing angle that matches the length of the detector 904 on the opposite side.

Figure 10:
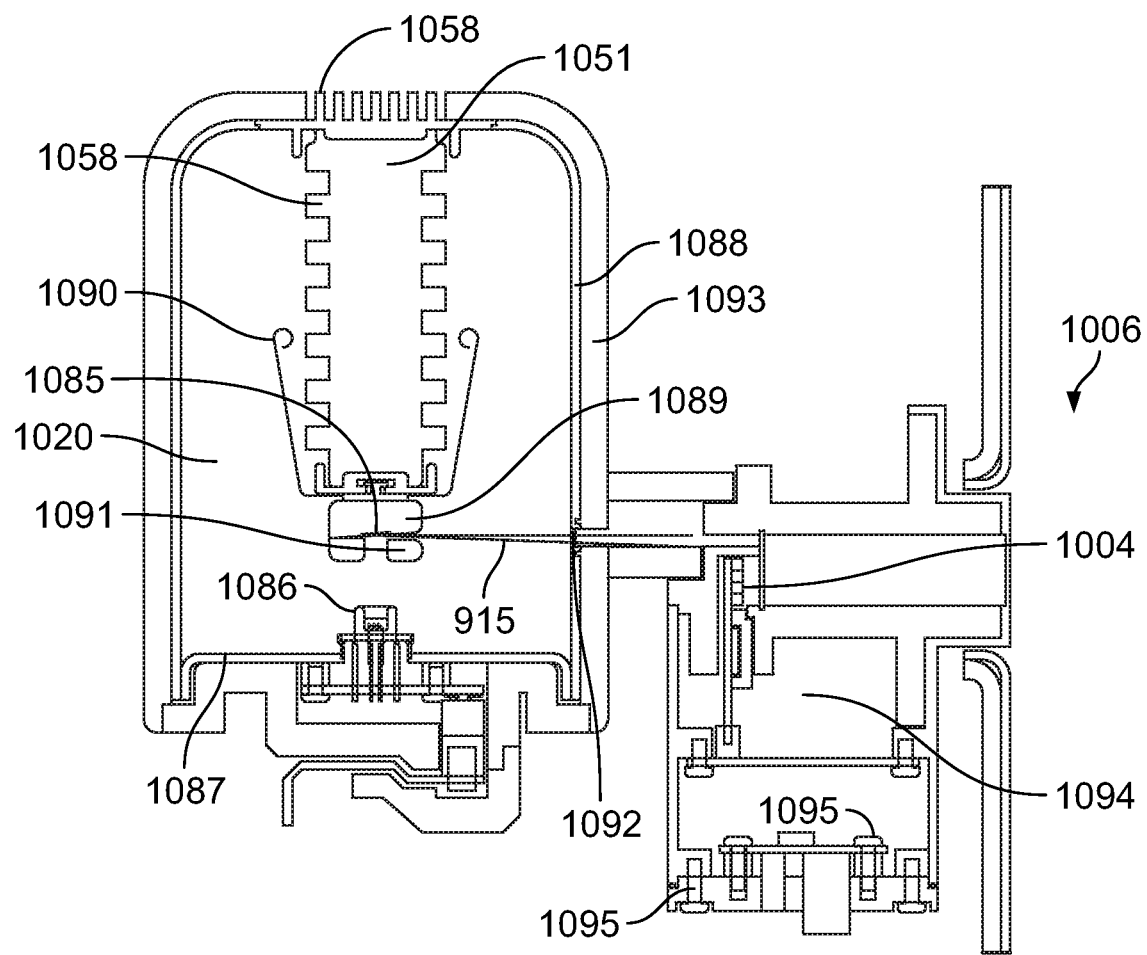
FIG. 10 is a cross-sectional view of an electron gun and detector array assembly positioned at one end of the imaging volume of the scanning unit of FIG. 9.

FIG. 10 is a cross-sectional view of an electron gun 1020 and detector array 1004 assembly positioned at one end of the imaging volume 906 of the scanning unit 900 of FIG. 9. In an embodiment, the anode 1085 and cathode 1086 of the X-ray source 1020 are machine built and the cathode sections 1086 are installed into one of a glass, metal, or ceramic base 1087. Anode sections 1085 are installed into a top 1088 made with material (glass, metal, or ceramic) that is similar to the material of base 1087. Next, the base 1087 is sealed with the top 1088 by using suitable welding techniques, thereby resulting in the anode 1085 and the cathode 1086 being enveloped in a vacuum envelope. In one embodiment, a metal housing is used to create the vacuum envelope of the electron gun 1020, wherein the metal housing includes a window fabricated from a low Z material. Block 1089 provided atop the anode 1085 and shield electrode 1090 is a slip coupling that accounts for thermal expansion. In accordance with an aspect of the present specification, the slip coupling block 1089 are attached to a feed-through thermally conductive element 1051 (as also shown in FIG. 8D), to enable heat dissipation from the anode 1085. In embodiments, the element 1051 comprises a plurality of fins or extensions 1058 to enable heat dissipation to ambient air. Use of the thermally conductive element 1051 obviates a need for circulating coolant to reduce anode temperature.

Figure 14:
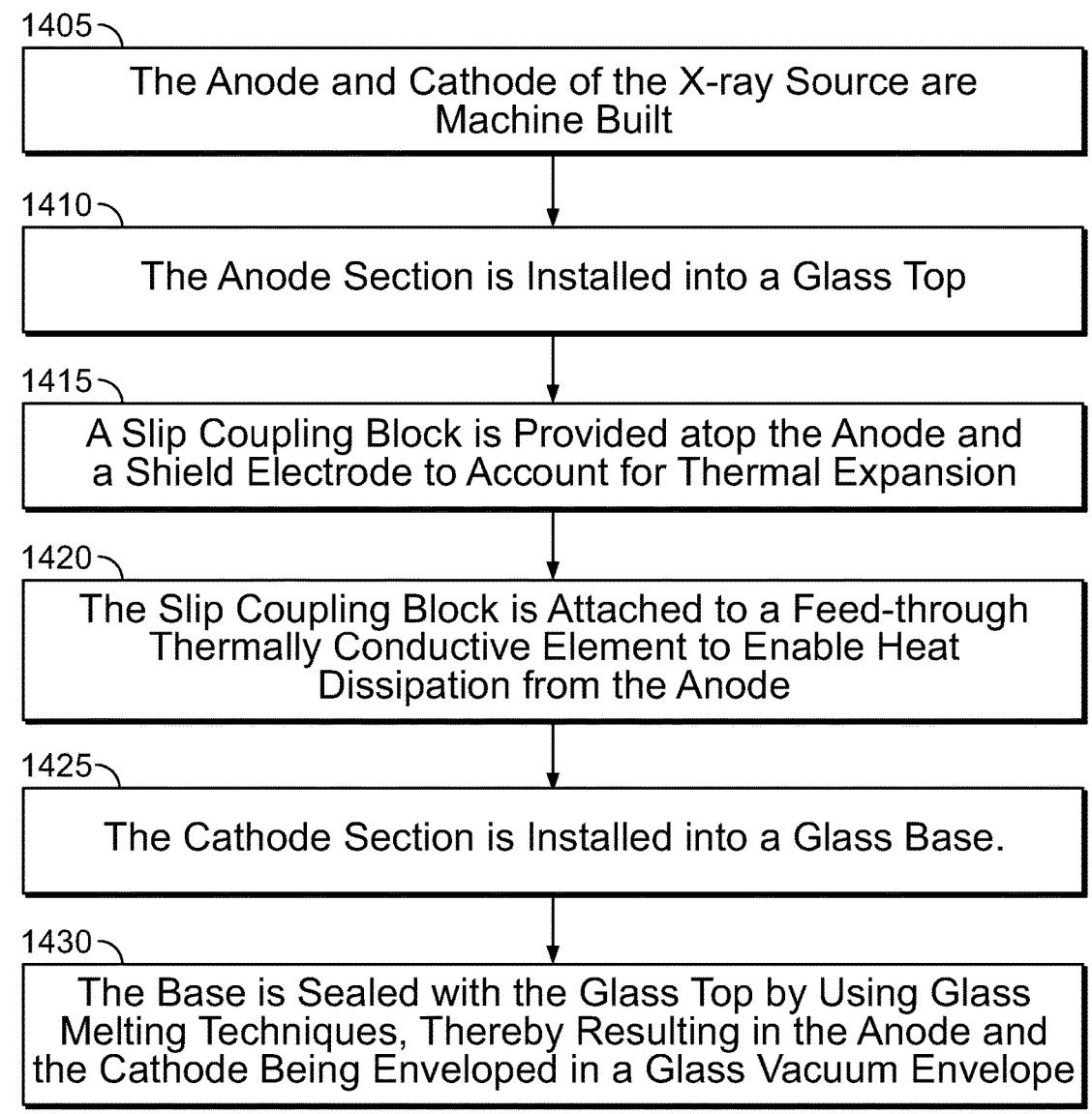
FIG. 14 is a flow chart of a plurality of exemplary steps of a method of manufacturing the X-ray source or electron gun of FIG. 10.

FIG. 14 is a flow chart of a plurality of exemplary steps of a method of manufacturing the X-ray source or electron gun 1020 of FIG. 10. At step 1405, the anode and cathode of the X-ray source are machine built. At step 1410, the anode section is installed into a glass top. At step 1415, a slip coupling block is provided atop the anode and a shield electrode to account for thermal expansion. At step 1420, the slip coupling block is attached to a feed-through thermally conductive element to enable heat dissipation from the anode. Next, at step 1425, the cathode section is installed into a glass base. Finally, at step 1430, the base is sealed with the glass top by using glass melting techniques, thereby resulting in the anode and the cathode being enveloped in a glass vacuum envelope.

Referring back to FIG. 10, X-rays emanating from the anode 1085 are collimated, using collimator 1091, to form the X-ray beam 1015. In various embodiments, the X-ray beam 1015 is a fan beam. In embodiments, the self-collimated anode 1085 minimizes off-focal radiation. The X-ray beam 1015 exits the electron gun 1020 through an opening 1092 in the shield 1093 towards the inspection volume 1006. The opening 1092 is a radiologically thin window to preserve low energy content in the beam 1015. In alternate embodiments, where a metal housing is used to create the vacuum envelope of the electron gun 1020, the opening 1092 (in the metal housing) is fabricated from a low Z material. The detector arrays 1004 are positioned just below a plane of the opening 1092 (on the same side as of the X-ray beam 1015) to lie between the electron gun 1020 and the inspection volume 1006. The detector arrays 1004 are located within a lead and composite material housing 1094 with easy service access from outside the inspection volume 1006 (using a plurality of screws 1095). The lead and composited material housing 1094 minimizes radiation damage to various electronics.

Referring back to FIGS. 2C and 8A, in accordance with aspects of the present specification, the amount of time that each individual X-ray source point 220 is 'on' can be adjusted electronically, and in real-time, while during each source exposure the source point is fixed (rather than moving as is the case with a conventional rotating gantry CT system). As discussed earlier, in contrast to conventional rotating gantry CT systems, the X-ray source firing pattern for the multi-focus X-ray source 202 is not constrained to move in a standard helical rotation about an object under inspection. The ability of random source firing as well as the ability to use non-uniform dwell time at each X-ray source point 220, enables combining an X-ray diffraction (XRD) system with the transmission RTT system 900 (of FIG. 9) using the same X-ray beam 215 for both XRD and RTT systems. Thus, the use of non-uniform dwell time at each X-ray source point 220 enables increased sampling for the associated XRD system—using the same X-ray beam 215 used for transmission RTT—in suspected threat regions for automated in-line, real time alarm clearance.

Figure 11:
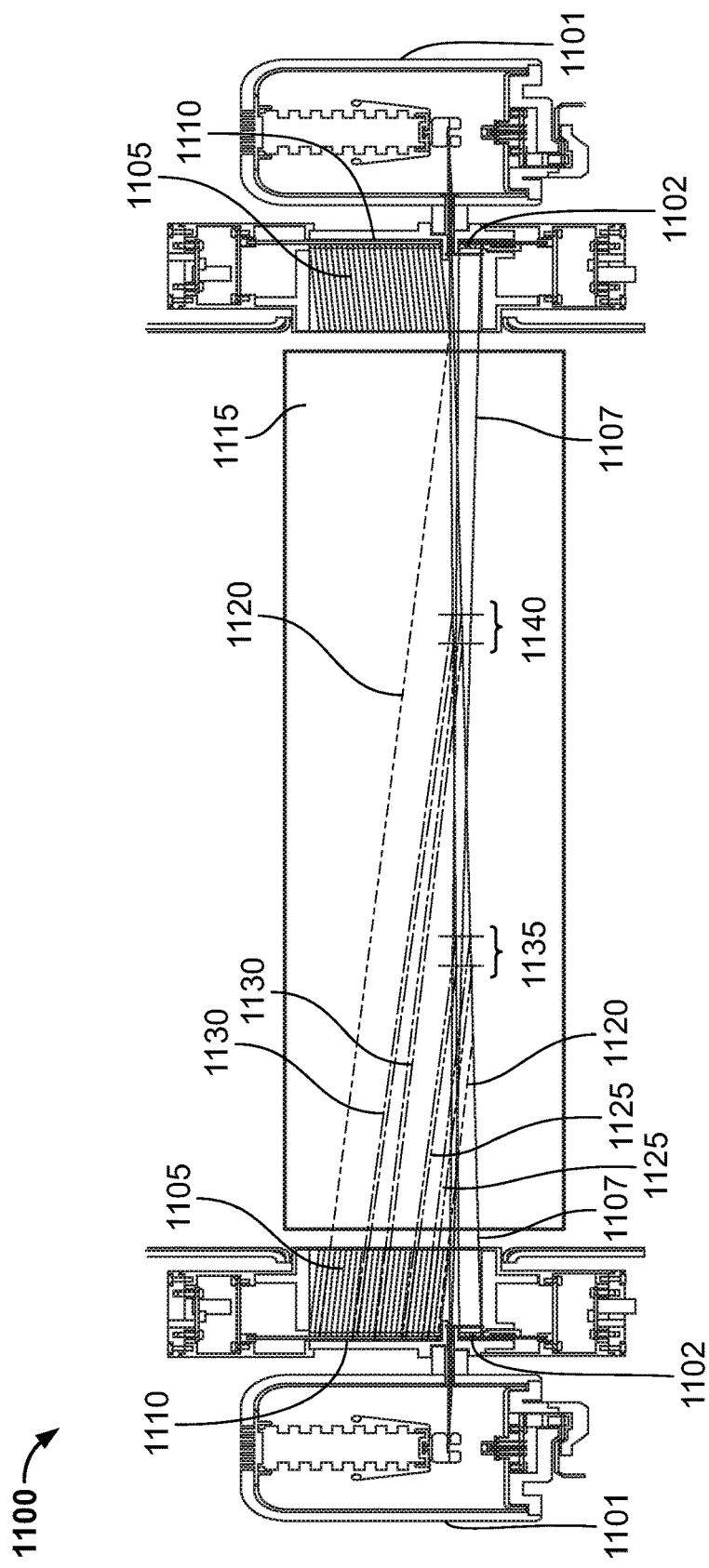
FIG. 11 illustrates a cross-sectional view through an imaging volume of a scanning unit combined with X-ray diffraction imaging system, in accordance with an embodiment of the present specification.

FIG. 11 shows a cross-sectional view through the imaging volume 1115 of a scanning unit (such as the scanning unit 900 of FIG. 9 and 1000 of FIG. 10) combined with an X-ray diffraction imaging system, in accordance with an embodiment of the present specification. In the combined RTT and XRD system 1100 of FIG. 11, the system 1100 is configured to function as a primary scanning system using transmission RTT with multi-energy detectors 1102 along with an optional secondary alarm clearance system using in-line real-time X-ray diffraction (XRD). In embodiments, the X-ray diffraction imaging system comprises a plurality of "venetian blind" or "slot" collimators 1105 angled at a small angle, for example 5 degrees, to the transmission RTT imaging beam 1107 (in the direction towards the beam 1107) along with an area array of energy dispersive X-ray detectors 1110 that are located behind the collimators 1105. The collimators 1105 provide a barrier that prevents X-rays from reaching each detector of the array 1110 unless it comes from a particular receiving direction. In various embodiments, the collimators 1105 are angled at an angle ranging from 3 to 10 degrees.

For each electron gun 1101, the energy dispersive X-ray detectors 1110, for XRD imaging, are positioned just above the plane of an opening 1150 from which the transmission RTT imaging beam 1107 emanates from the electron gun 1101. In various embodiments, the beam 1107 is a fan beam. The detectors 1110 are positioned within a lead and composite material housing 1152. The multi-energy detectors 1102, for transmission RTT imaging, are positioned just below the plane of the opening 1150 (as also described with reference to FIGS. 8 and 9) within another lead and composite housing 1154. Housings 1152, 1154 are easily accessible (using screws) for servicing and maintenance of the detectors 1110, 1102. The detectors 1102 and 1110 are positioned between the opening 1150 and the inspection volume 1115 for each electron gun 1101 shown on either side of the inspection volume 1115.

In some embodiments, each of the detectors 1110 has sensitive area 2.5 mm wide×2.5 mm high and together they form a 60 mm high "wall" of sensors that extend around the whole periphery of the imaging volume or inspection tunnel 1115. The large energy sensitive diffraction sensor area (of about 41,000 $mm^2$) provides efficiency gains that conventional systems seek to achieve either through high beam flux or by open collimation approaches.

As shown in FIG. 11, the lines 1120 show an extent of the diffraction field of view whereas lines 1125 and 1130 indicate scattering paths (containing X-ray diffraction photons) at 5 degrees (relative to the transmission RTT beam 1107) from two, exemplary, 20 mm wide regions 1135, 1140 each 120 mm from the center of the inspection/imaging volume or inspection tunnel 1115. It should be appreciated that the collimated detector array 1110 can be used to define different inspection regions in an object under inspection.

Each photon counting, energy sensitive, pixel in the diffraction detector array 1110 projects back to a small arc-shaped volume within the imaging volume 1115. This arc is defined by the intersection of X-rays from each individual sensor pixel back through the 5 degree collimator 1105 and to the fan-beam 1107 projecting from the electron gun or X-ray source point 1101 through the imaging volume 1115. The use of this arc with one-dimensional collimation gives a much higher diffraction efficiency (that is, the number of diffracted photons detected per incident X-ray photon) than would be the case if two-dimensional collimation were used. Thus, every photon counting pixel in the diffraction detector array 1110 can measure spatial location and energy. By knowing position and energy of an interacting photon, the location from which the scattered photon has arrived and the elemental composition of the location can be determined.

In order to form a reasonable coherent diffraction signal data is collected for all source points 801 within a tomographic scan and then the results are accumulated for each sub-volume of the imaging volume 1115. For a scanner with 256 source points, and an average of four to five coherent diffraction scatter results per sub-volume per scan, then following accumulation of the set of data, each sub-volume will have more than 1000 results associated with it, corresponding to 256 scattering events within that sub-volume. A typical sub-volume occupies an area within the imaging plane of a few square centimeters, with a volume thickness of a few millimeters.

In accordance with an aspect, the diffraction signal (an energy spectrum) is recorded for every sensor in the diffraction imaging array 1110 for every X-ray source point 1101. This data set (comprising both energy dispersive and angular dispersive data) is then converted into a 2D set of slice images using an iterative back-projection method to create a 3D diffraction tomography image where each voxel in the image describes the diffraction energy spectrum (and hence material composition) of the object located within the imaging volume 1115 at that region in space. The process occurs in real-time at the same time as the transmission RTT image is collected. Thus, a primary detection image (using the transmission RTT imaging) and a secondary clearance image (using the XRD imaging) are created at the same time and can both be used to create an overall threat detection capability for each item in an object under inspection.

It should be appreciated that it is not required to slow or stop the conveyor during the screening process nor is it necessary to re-register the object under inspection between the RTT imaging and the diffraction imaging processes since both imaging processes are conducted at the same time. The 3D volume of each potential threat object is known from the RTT volume data and therefore in a second verification step, all the diffraction data belonging to that one volume (be it bulk or sheet) can be combined to maximize photon statistics and so create a further, accurate, data point in the threat detection capability.

It should be noted that those detectors not being used for forward X-ray diffraction or transmission RTT imaging will record the Compton backscatter signal which is a sensitive indicator of low-Z materials near the surface of the object under inspection. In some embodiments, this information may be reconstructed into a Compton scatter image and further correlated with the RTT scan data to create a separate item in the overall threat detection capability for the object under inspection.

Figure 12:
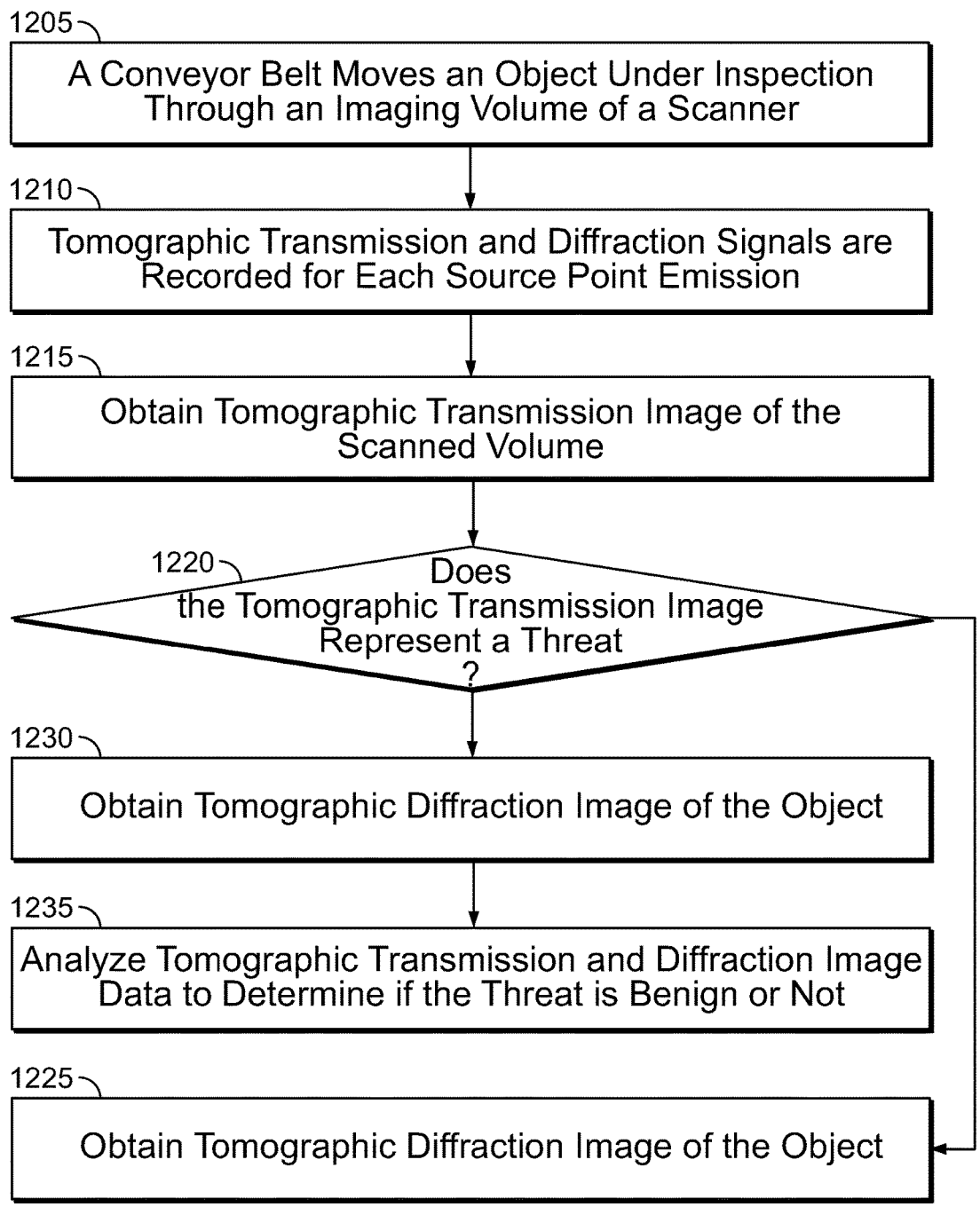
FIG. 12 is a flow chart describing a method of automatic threat detection and clearance using the combined X-ray transmission and X-ray diffraction systems shown in FIG. 11.

FIG. 12 is a flow chart of a plurality of exemplary steps of a method of automatic threat detection and clearance using combined X-ray transmission RTT and XRD systems of FIG. 11. Referring now to FIGS. 11 and 12, at step 1205, a conveyor belt moves an object under inspection through the imaging volume 1115 parallel to a longitudinal axis of the scanner 1100. At step 1210, as each source point 1101 emits a fan beam 1107 of X-rays, the tomographic transmission scan signals from the detectors 1102, which are dependent on the intensity of the X-rays incident on the detector 1102, are produced, and the intensity data that the signals provide are recorded in memory. Simultaneously, as each source point 1101 emits a fan beam 1107 of X-rays, diffraction signals (an energy spectrum) are recorded for every sensor in the diffraction imaging array 1110 for every X-ray source point 1101.

At step 1215, once the scan is completed the tomographic transmission signals from detectors 1102 are processed using a filtered back-projection method to form a tomographic transmission image of the scanned volume. At step 1220, a threat detection processor determines whether the tomographic transmission image represents a threat. If no threat is detected, then the object is cleared at step 1225. However, if the object is flagged as a threat, then at step 1230, the diffraction signals recorded using detectors 1110 are converted into a 2D set of slice images using an iterative back-projection method to create a 3D diffraction tomography image where each voxel in the image describes the diffraction energy spectrum (and hence material composition) of the object located within the imaging volume 1115 at that region in space.

For each scan, the tomographic transmission image data from the detectors 1102 produces data relating to the X-ray attenuation for each pixel of the image, which in turn corresponds to a respective sub-volume of the tomographic imaging volume. The data from the scatter detectors 1110 provides tomographic diffraction image data relating to the amount of coherent scattering within each sub-volume, and data relating to the amount of incoherent scattering within each sub-volume. At step 1235, the tomographic diffraction image data, along with the tomographic transmission image data, is analyzed using the threat detection processor to determine if the threat is benign or not. Examples of parameters that are extracted from the transmission and/or diffraction data are the ratio of coherent to incoherent diffraction, material types as determined from coherent diffraction data, material density as determined from incoherent diffraction data, correlation of tomographic transmission image pixel values with diffraction data. Thus, from the Bragg scattering data, for each detected diffraction event, the combination of the X-ray energy and the scatter angle can be used to determine the inter-atomic distance d of the material in which the diffraction event took place. In practice, the scatter angle can be assumed to be constant, and the energy used to distinguish between different materials. For the Compton scattering, the level of scattering from each volume of the scanning volume gives an indication of the density of the material in that volume. The ratio of Compton to coherent scatter can also be determined and used as a further parameter to characterize the material of the imaged object.

It shall be recognized by one skilled in the art that the objective of the diffraction and Compton backscatter imaging is to generate an alternative signature that can be used to clear the specific threat raised by analysis of the multi-energy transmission computed tomography image data. In this respect, the performance of the diffraction and backscatter imaging does not need to be of laboratory grade, since it is necessary only to clear a threat raised by analysis of the higher quality transmission X-ray imaging data. This facilitates diffraction imaging at high conveyor speed (ranging from 0.1 m/s to 0.5 m/s) where typically systems would be too photon starved to create a laboratory grade signal.

The above examples are merely illustrative of the many applications of the system of present specification. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

I claim:

1. An X-ray inspection system configured to scan an object, comprising:
    a housing enclosing a scanning volume;
    a conveyor to transport the object through the scanning volume for inspection;
    a multi-focus X-ray source having a plurality of X-ray source points arranged in a non-circular geometry around the scanning volume, wherein field of views of each of said plurality of X-ray source points vary across said plurality of X-ray source points;
    a first detector array positioned between the multi-focus X-ray source and the scanning volume, wherein said first detector array has a plurality of multi-energy detector modules arranged in a non-circular geometry around the scanning volume to detect X-rays transmitted through the object during scanning;
    a second detector array positioned between the X-ray source and the scanning volume to detect X-rays diffracted from the object during scanning, wherein said second detector array comprises a plurality of energy dispersive detector modules located behind a plurality of associated collimators that are angled relative to the X-rays; and
    at least one processor configured to simultaneously generate a tomographic transmission image using said X-rays transmitted through the object and a tomographic diffraction image using said X-rays diffracted from the object in order to identify a threat.

2. The X-ray inspection system of claim 1, wherein said field of views range from approximately 60 degrees to 120 degrees.

3. The X-ray inspection system of claim 1, wherein said collimators are angled at an angle ranging from 3 degrees to 10 degrees relative to a direction of the X-rays.

4. The X-ray inspection system of claim 1, wherein a portion of at least one of said first and second detector arrays detect X-rays backscattered from the object, and wherein said at least one processor is further configured to generate a backscatter image of the object.

5. The X-ray inspection system of claim 4, wherein at least one of said tomographic diffraction image or said backscatter image is used to clear or confirm the identified threat.

6. The X-ray inspection system of claim 1, wherein the housing is substantially rectangular, and wherein the housing has a width ranging from 800 mm to 1400 mm and a height ranging from 600 mm to 1500 mm.

7. The X-ray inspection system of claim 1, wherein the non-circular geometry of the plurality of X-ray source points is rectangular.

8. The X-ray inspection system of claim 1, wherein the non-circular geometry of the plurality of multi-energy detector modules is rectangular.

9. The X-ray inspection system of claim 1, wherein the scanning volume has a width ranging from 500 mm to 1050 mm and a height ranging from 300 mm to 1050 mm.

10. The X-ray inspection system of claim 1, wherein each of the plurality of multi-energy detector modules is configured to allocate detected photons into one of 2 to 64 energy bins.

11. The X-ray inspection system of claim 1, wherein the plurality of X-ray source points ranges from 64 to 2048 X-ray source points, wherein the plurality of X-ray source points are configured in a plurality of groups, and wherein each of the plurality of groups has 4 to 32 X-ray source points.

12. The X-ray inspection system of claim 11, wherein each of the plurality of groups comprises eight X-ray source points.

13. The X-ray inspection system of claim 11, further comprising a common insulating substrate configured to support each of the group of the plurality of groups.

14. The X-ray inspection system of claim 1, wherein the conveyor is configured to have a speed ranging from 0.1 m/s to 1.0 m/s.

15. The X-ray inspection system of claim 1, wherein each source point of the plurality of X-ray source points is configured to emit X-rays having a different beam angle.

16. The X-ray inspection system of claim 1, wherein each source point of the plurality of X-ray source points is enclosed in one of a glass, metal, and ceramic envelope.

17. The X-ray inspection system of claim 1, wherein each source point of the plurality of X-ray source points comprises an anode assembly comprising:
    a target coupled with a high voltage power source;
    one or more coupling blocks configured to account for a thermal expansion of the target; and
    a shield electrode configured to protect the target and a power source from the X-rays.

18. The X-ray inspection system of claim 1, wherein each source point of the plurality of X-ray source points comprises a cathode assembly comprising:
    at least a grid;
    a dispenser cathode;
    a filament;
    a primary focus electrode, wherein the at least a grid, dispenser electrode, filament, and primary focus electrode are in electrical communication with a printed circuit board; and
    a secondary focus electrode configured to protect the cathode assembly from a flash of energy.

* * * * *